United States Patent
Thom et al.

(10) Patent No.: US 10,546,276 B2
(45) Date of Patent: Jan. 28, 2020

(54) CYBER OWNERSHIP TRANSFER

(71) Applicant: Microsoft Technology Licensing, LLC, Redmond, WA (US)

(72) Inventors: Stefan Thom, Snohomish, WA (US); David Thaler, Redmond, WA (US); Torsten Stein, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 15/703,884

(22) Filed: Sep. 13, 2017

(65) Prior Publication Data
US 2019/0080299 A1    Mar. 14, 2019

(51) Int. Cl.
*H04L 9/08* (2006.01)
*G06Q 20/02* (2012.01)
*G06Q 20/38* (2012.01)
*G06F 7/72* (2006.01)
*H04L 9/32* (2006.01)

(52) U.S. Cl.
CPC ......... *G06Q 20/02* (2013.01); *G06Q 20/3821* (2013.01); *G06Q 20/3829* (2013.01); *H04L 9/0844* (2013.01); *G06F 7/725* (2013.01); *H04L 9/0894* (2013.01); *H04L 9/3263* (2013.01)

(58) Field of Classification Search
USPC ........................................................ 380/286
See application file for complete search history.

(56) References Cited

U.S. PATENT DOCUMENTS

| | | | |
|---|---|---|---|
| 4,799,258 A | 1/1989 | Davies | |
| 5,633,929 A * | 5/1997 | Kaliski, Jr. | ........... H04L 9/0894 380/28 |
| 5,666,414 A | 9/1997 | Micali | |
| 5,745,573 A | 4/1998 | Lipner et al. | |

(Continued)

FOREIGN PATENT DOCUMENTS

CN          106899583 A     6/2017

OTHER PUBLICATIONS

"International Search Report and Written Opinion Issued in PCT Application No. PCT/US18/038869", dated Oct. 1, 2018, 11 Pages.

(Continued)

*Primary Examiner* — Amare F Tabor
(74) *Attorney, Agent, or Firm* — Holzer Patel Drennan

(57) ABSTRACT

The cyber owner of the asset can transfer cyber ownership to a second entity based on a transaction and using an escrow entity. An escrow service in association with an escrow entity is utilized to secure transfer of ownership to the second entity in accordance with the conditions of the transaction. The cyber owner initiates an escrow process by transmitting an escrow instruction to the access configuration controller. A new cryptographic key is generated responsive to the escrow instruction and is managed by a generated escrow policy indicating an escrow period. Different components of the cryptographic key are transmitted to the second entity and the escrow service. When the conditions of the transaction are satisfied during the escrow period, the escrow service transmits the component of the cryptographic key to the second entity. The second entity may use the recomposed cryptographic key to assert ownership of the asset.

20 Claims, 8 Drawing Sheets

(56) References Cited

U.S. PATENT DOCUMENTS

| | | | |
|---|---|---|---|
| 5,768,388 A * | 6/1998 | Goldwasser | H04L 9/0894 380/286 |
| 5,799,086 A * | 8/1998 | Sudia | G06Q 20/02 705/76 |
| 5,841,865 A | 11/1998 | Sudia | |
| 6,118,874 A | 9/2000 | Okamoto et al. | |
| 6,141,423 A | 10/2000 | Fischer | |
| 6,721,424 B1 * | 4/2004 | Radatti | H04L 63/0428 380/286 |
| 7,257,844 B2 | 8/2007 | Woodward | |
| 8,189,794 B2 * | 5/2012 | Russo | G06Q 30/0641 380/201 |
| 8,644,510 B2 * | 2/2014 | Cakulev | H04L 9/0894 380/255 |
| 8,971,539 B2 * | 3/2015 | Pandrangi | G06F 21/6209 380/286 |
| 9,419,951 B1 | 8/2016 | Felsher et al. | |
| 2001/0050990 A1 * | 12/2001 | Sudia | G06Q 20/02 380/286 |
| 2003/0126439 A1 | 7/2003 | Wheeler et al. | |
| 2008/0215474 A1 | 9/2008 | Graham | |
| 2009/0044015 A1 | 2/2009 | Gantman et al. | |
| 2012/0173885 A1 | 7/2012 | Acar et al. | |
| 2013/0091556 A1 | 4/2013 | Horn et al. | |
| 2015/0074764 A1 | 3/2015 | Stern | |
| 2015/0312041 A1 | 10/2015 | Choi | |
| 2016/0330182 A1 | 11/2016 | Jeon et al. | |
| 2016/0379220 A1 | 12/2016 | Tunnell et al. | |
| 2017/0063566 A1 | 3/2017 | Seminario et al. | |
| 2019/0081792 A1 | 3/2019 | Thom et al. | |

OTHER PUBLICATIONS

Abelson, et al., "The Risks of Key Recovery, Key Escrow, and Trusted Third-Party Encryption", https://www.schneier.com/academic/archives/1997/04/the_risks_of_key_rec.html, Published on: Apr. 1997, 25 pages.

Hu, Fei, "Wireless Embedded Microsystems", In Publication of CRC Press, Sep. 26, 2013, 1 page.

Feller, Thomas, "Towards Trustworthy Cyber-Physical Systems", In Publication of Springer, Aug. 25, 2014, 2 pages.

Konstantinou, et al., "Cyber-Physical Systems: A Security Perspective", In Proceedings of 20th IEEE European Test Symposium, May 25, 2015, 8 pages.

AllJoyn™ Security 2.0 Feature High-Level Design, https://allseenalliance.org/framework/documentation/learn/core/security2_0/hld, retrieved on: Aug. 29, 2017, 53 pages.

Device Pairing Kinds Enum, https://docs.microsoft.com/en-us/uwp/api/Windows.Devices.Enumeration.DevicePairingKinds, retrieved on: Aug. 29, 2017, 2 pages.

OCF Security Specification V1.0.0, https://openconnectivity.org/draftspecs/OCF_Security_Specification_v1.0.0.pdf, retrieved on: Aug. 29, 2017, 104 pages.

"International Search Report and Written Opinion Issued in PCT Application No. PCT/US18/038868", dated Aug. 17, 2018, 12 Pages.

* cited by examiner

CYBER OWNERSHIP TRANSFER

BACKGROUND

"Cyber assets" refer to devices, systems, data, code, etc., whether tangible or intangible, for which the ability to control access configurations of the asset represents a type of "cyber ownership." Example cyber assets may include without limitation vehicles, computing devices, biological systems, real property, buildings, equipment, databases, data objects, etc. having cryptographically-controlled access configurations (e.g., controlled by a security system, a lock, and/or an access control list). Access configurations represent systems and/or electronic data records that control access to a cyber asset.

SUMMARY

Implementations described and claimed herein address the foregoing problems by providing a method for managing access to an asset including generating a transfer cryptographic key responsive to receipt of an escrow instruction at an access configuration controller controlling access to the asset. The escrow instruction is received from a first entity and identifies an escrow entity and a second entity. The generated transfer cryptographic key is controlled by a policy encoding an escrow period. The method further includes decomposing the transfer cryptographic key into at least a first cryptographic key component and a second cryptographic key component, distributing the first cryptographic key component to the escrow entity and the second cryptographic key component to the second entity, and verifying whether a received ownership instruction is validly signed. The received ownership instruction is validly signed when the ownership instruction is received during the escrow period and is signed by a copy of the transfer cryptographic key recomposed using the first cryptographic key component and the second cryptographic key component. The received ownership instruction is invalidly signed when the received ownership instruction is received inside the escrow period and is not signed by the copy of the transfer cryptographic key. The received ownership instruction is also invalidly signed when the received ownership instruction is received outside the escrow period and signed by the copy of the transfer cryptographic key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
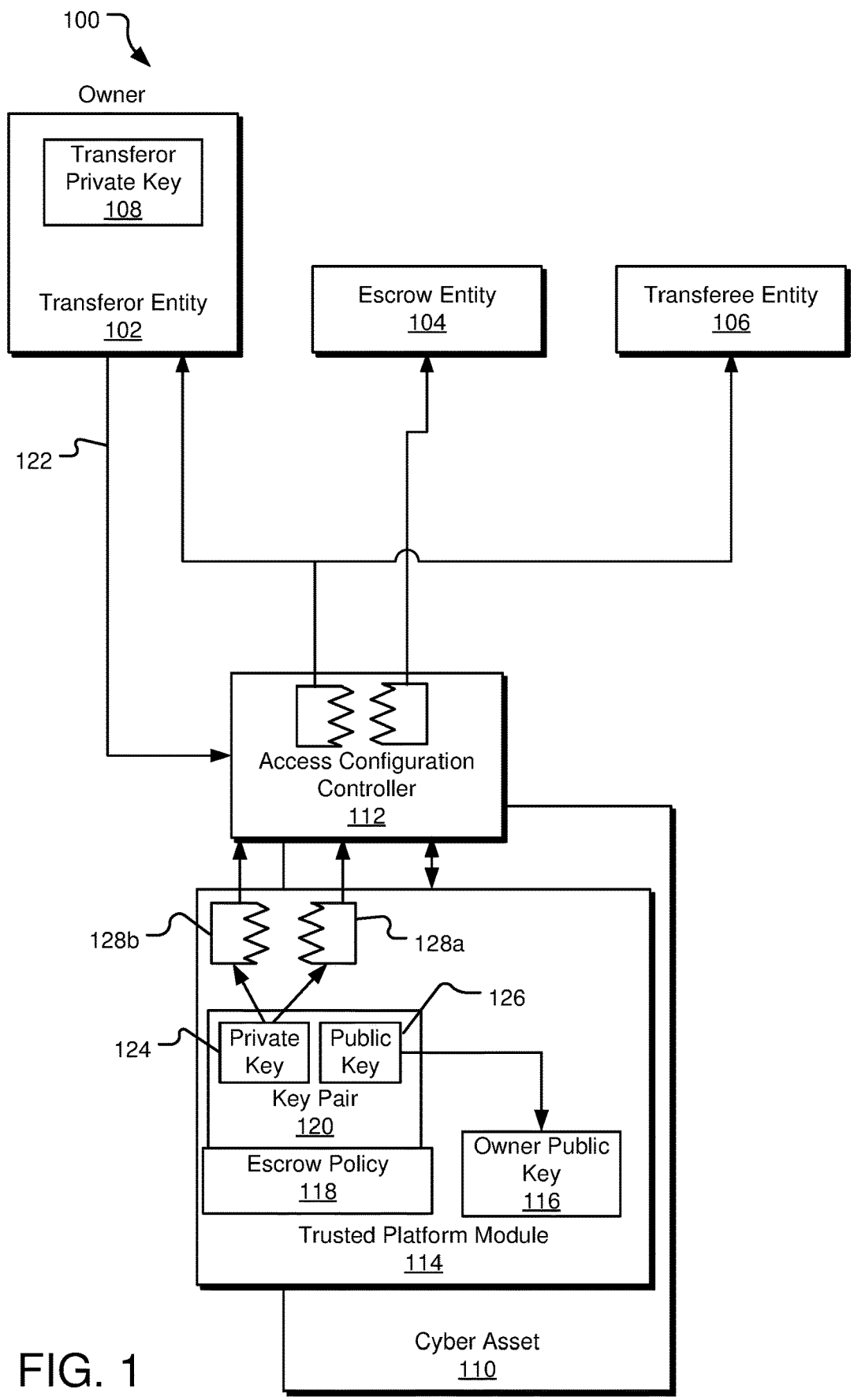
FIG. 1 illustrates an example system for transferring cyber ownership of a cyber asset using an escrow service.

Access and control of a cyber asset is managed by an access configuration controller associated with the asset. The access configuration controller accesses a public cryptographic key securely stored in association with the access configuration controller. A private cryptographic key cryptographically paired with the public cryptographic key is stored in an entity managed by the "cyber owner" of the asset. The cyber owner of the asset utilizes the private cryptographic key to access and control the asset using various instructions that are signed using the private cryptographic key. The access configuration controller validates such instructions using the public cryptographic key securely stored in association with the access configuration controller.

The cyber owner of the asset can transfer cyber ownership to a second entity using a cyber ownership transfer transaction. The transaction includes certain conditions that are to be satisfied before ownership of the cyber asset is transferred to the second entity. An escrow service associated with an escrow entity is utilized to secure transfer of ownership to the second entity in accordance with the conditions of the transaction. The cyber owner initiates an escrow process according to the transaction by transmitting an escrow instruction to the access configuration controller. A secure platform device generates a new cryptographic key pair responsive to the escrow instruction. Different key components decomposed from the private cryptographic key of the generated key pair are transmitted to the second entity and the escrow service. When the conditions of the transaction are satisfied during the escrow period, the escrow service transmits its component of the private key to the second entity. The second entity utilizes the received components to recompose the private key, signs an instruction with the recomposed private key, and transmits the signed instruction to the cyber asset. Thus, the second entity asserts cyber ownership of the cyber asset using the escrowed private key. If the escrow period expires before the conditions of the transaction are satisfied, the original private cryptographic key is restored resulting in return of ownership to the original entity.

When the new cryptographic key pair is generated, a policy is associated with the key pair that defines the escrow period. According to the generated policy, the new cryptographic key pair is operable during an escrow period. After expiration of the escrow period, if no entity asserts "ownership" of the cyber asset using the generated private key, ownership is returned (according to the policy) to the original cyber owner entity using a prior private cryptographic key. During the escrow process, the escrow service (escrow entity) is never able to assert ownership of the asset because the escrow entity is never in possession of all components of the decomposed key. Accordingly, the escrow service is able to escrow assets that are more valuable than the escrow service.

FIG. 1 illustrates an example system 100 for transferring cyber ownership of a cyber asset using an escrow service.

Access or control of a cyber asset 110 is managed by a corresponding access configuration controller 112 using one or more cryptographic keys. The access configuration controller 112 has access to a memory that stores a public cryptographic key 116. The public cryptographic key is stored as a root of trust (RoT), which is generally implemented as a cryptographic key certificate. The public cryptographic key 116 is cryptographically paired to a private cryptographic key securely stored in a memory of an entity that has cyber ownership of the cyber asset. In other words, the entity possessing the private cryptographic key cryptographically paired to the RoT is authorized (by the access configuration controller 112) to perform certain actions in association with the asset 110. For example, a transferor entity 102 is the cyber owner of the asset because the transferor entity 102 securely stores a private cryptographic key (e.g., a transferor private cryptographic key 108), which is cryptographically associated with the public cryptographic key (e.g., the public cryptographic key 116) securely stored and accessible by the access configuration controller 112. Accordingly, the public cryptographic key 116 may be referred to as an owner public cryptographic key and the associated private cryptographic key (e.g., the transferor private cryptographic key 108) may be referred to as the owner private cryptographic key.

The entity controlling the owner private cryptographic key signs instructions that are transmitted to the asset, and the access configuration controller 112 can validate instructions (e.g., verify that the instructions are signed by the corresponding owner of the private cryptographic key) using the public cryptographic key 116. The access configuration controller 112 receives the various instructions via a communications interface (not shown). Example instructions that may be communicated from the owner entity to the asset 110 include, without limitation, access control change instructions, control instructions, escrow instructions, etc. For example, an access control change instruction is signed by the transferor private cryptographic key 108 and can be read by the access configuration controller 112 using radiofrequency (RF) induction. If the access configuration controller 112 can verify that the access control change instruction is validly signed by the transferor private cryptographic key 108 of the transferor entity 102, the access configuration controller 112 can then grant the entity possessing the private cryptographic key 108 access to access authorization records for the cyber asset. Such access then allows the entity to erase previous access authorization records and write new access authorization records of the entity's choosing.

Access authorization records may include without limitation identification and credentials of an access-authorized entity, a level of access, and constraints on access. As such, in one implementation, the access authorization records define credentials by which different entities are authorized to access the asset 110 and access parameters defining how much access each entity is granted. In this manner, an access configuration controller controls access to the asset based on the corresponding access authorization records associated with the asset.

Furthermore, the private cryptographic key 108 permits the entity in possession of the private cryptographic key 108 to access and operate the asset 110. For example, if the asset 110 is a vehicle with a cryptographically-controlled access (e.g., via the access configuration controller 112). The access configuration controller 112 is configured to permit access to the entity to power on and control operation of the vehicle. For example, the owner of the vehicle utilizes a device (entity) that securely stores the private cryptographic key 108. The device may be a USB device, key card, mobile computing device, etc. The private cryptographic key 108 is readable by or transmittable to the access configuration controller 112. When the owner of the vehicle wishes to utilize the vehicle, the owner utilizes the device securely storing the private cryptographic key 108 to securely communicate an instruction signed by the private cryptographic key 108 to the access configuration controller 112. The access configuration controller 112 validates the signature and processes the instruction and permits the owner to utilize and control the vehicle.

The access configuration controller 112 utilizes a trusted platform module (TPM) 114 for secure cryptographic key management. The TPM 114 may be implemented as firmware executing in a physical or logical trusted execution environment (TEE) device or a physical trusted platform module (TPM) device, such as a TPM chip. Accordingly, in some example implementations, the TPM 114 is a microcontroller, such as a discrete silicon component in a semiconductor package or an integrated component incorporated in one or more semiconductor packages. In other implementations, the TPM 114 is a firmware based TPM executing in a TEE on a general-purpose system on chip (SoC). In some example implementations, the TPM 114 includes one or more registers for securely storing one or more cryptographic keys for access control management and other cryptographic operations (e.g., encryption). The TPM 114 may further include memory implemented in various forms including, without limitation, one or more read-only-memory (ROM) devices, one or more write-once, read many (WORM) memory devices, and integrated circuits (ICs). Such memory may securely store an unalterable and unique cryptographic trusted root key. In some example implementations, controlling entities (e.g., the transferor entity 102) may also implement TPMs for secure cryptographic key management. The TPM 114 and/or the TEE has private ownership functionality, which means that the TPM 114 can generate private keys and prevent the owner from extracting the private keys. The TPM 114 may further generate/manage polices that are associated with a key. The policies define one or more conditions that may or must be satisfied by an entity/asset/device before the associated key can be accessed and/or used. Such conditions may be proposed and agreed upon by the various entities.

Under various circumstances, the current cyber owner of the asset 110 transfers ownership of the asset 110 to a second party/entity according to a transaction. Escrow services provide security in transactions by determining that conditions of the transaction are satisfied before the transaction is completed. In FIG. 1, the escrow service utilizes an escrow entity 104 to effectuate transfer of a private cryptographic key to transfer cyber ownership between the transferor entity 102 to the transferee entity 106 upon satisfaction of the conditions of the transaction.

To initiate the transfer of cyber ownership, the transferor entity 102 transmits an escrow instruction 122 to the access configuration controller 112. The escrow instruction 122 is cryptographically signed by the private cryptographic key 108 of the transferor entity 102. The escrow instruction 122 includes certificates of the escrow entity 104 and a transferee entity 106. The certificates identify and certify cryptographic keys (e.g., public cryptographic keys) of the escrow entity 104 and the transferee entity 106. In some example implementations, the escrow instruction 122 further includes a parameter defining an escrow period. The access configuration controller 112 uses the public cryptographic key 116 cryptographically associated with the private cryptographic key 108 to validate the escrow instruction 122.

After validating the escrow instruction 122, the access configuration controller 112, using the TPM 114, generates a new cryptographic key pair 120 including a private cryptographic key 124 and a public cryptographic key 126. The cryptographic key pair is associated with an escrow policy 118. The escrow policy 118 defines an escrow period in which the cryptographic key pair 120 is operable. The generated private cryptographic key 124 is "decomposed" by the TPM 114 into two or more components, a private cryptographic key component 128a and 128b. When a key is decomposed into different components, the different components alone cannot be used to recompose/reconstruct the original key. A party/entity needs both components to recompose the original key.

In some example implementations, the generated private cryptographic key 124 is a 1024-bit key and the 1024-bit key is decomposed by "splitting" the 1024 bits into two components (e.g., 512 bits and 512 bits). It should be understood that other lengths of keys (e.g., 2048 bits) may be similarly split. In another example method of decomposing, the generated private cryptographic key 124 is a 1024-bit key. The TPM 114 generates another 1024-bit "key" (e.g., a random number). The TPM 114 exclusively or (XORs) the bits of the private cryptographic key 124 and the other 1024-bit key to generate a third 1024-bit key. The third 1024-bit key and the random number 1024-bit key are the two private cryptographic key components 128a and 128b, which may be combined (using an XOR operation) to recompose the private cryptographic key 124. It should be understood that other methods of decomposing the private cryptographic key 124 into to the private cryptographic key components 128a and 128b are contemplated.

The private cryptographic key component 128a (along with escrow policy parameters) may be encrypted using a public cryptographic key associated with the escrow entity (e.g., the public cryptographic key received in the certification of the escrow instruction 122) and transmitted to the escrow entity 104. The private cryptographic key component 128a may be transmitted to the escrow entity 104 via the transferor entity 102. Because the private cryptographic key component 128a is encrypted using the public cryptographic key of the escrow entity 104, only the escrow entity 104 (which possesses the private cryptographic key component of the public cryptographic key of the escrow entity) may decrypt the private cryptographic key component 128a. The private cryptographic key components 128a and 128b may be transmitted using a communications interface (not shown). Furthermore, instructions for recomposing the private cryptographic key 124 may be included in with the transmissions to the escrow entity 104, the transferee entity 106 and the transferor entity 102. In one example implementation, the instructions are included as a parameter in the escrow policy 118. As such, when either the transferee entity 106 or the transferor entity 102 possesses both portions 128a and 128b, the entity may recompose the private key 124

The private cryptographic key component 128 (and escrow policy parameters) is transmitted to both the transferor entity 102 and the transferee entity 106. Accordingly, the private cryptographic key component 128b is duplicated, one copy is encrypted using a public cryptographic key of the transferor entity 102 and another copy is encrypted using the public cryptographic key of the transferee entity 106. Accordingly, both the transferor entity 102 and the transferee entity 106 are able to decrypt the respective copies of the private cryptographic key component 128b. It should be understood that the (encrypted) private cryptographic key component 128b may be transmitted to the transferee entity 106 via the transferor entity 102.

After transmission of the private cryptographic key components 128a and 128b to the respective entities, the access configuration controller 112 monitors receipt of acknowledgement communications from the entities. The escrow entity 104 acknowledges receipt of the private cryptographic key component 128a, and the transferor entity 102 and the transferee entity 106 acknowledge receipt of the private cryptographic key component 128b. The entities may acknowledge receipt of the respective key components by signing an acknowledgement message with their private cryptographic keys. In some example implementations, the acknowledgement messages are transmitted to the access configuration controller 112 via the transferor entity 102. The acknowledgement message may further indicate acceptance by the various entities of the terms of the escrow policy (e.g., the escrow period), the terms of the agreement, the escrow entity/service used, the key reconstruction method, etc.

When the access configuration controller 112 validates acknowledgement messages received from the three entities, the escrow period is initiated. To initiate the escrow period, the generated public cryptographic key 126 is stored as the owner public cryptographic key 116. Such storage may include loading the public cryptographic key 126 into a register of the TPM 114 and activating the escrow policy. The escrow policy 118 defines the escrow period by defining the amount of time that the cryptographic key pair 120 is operable with the asset 110 and the access configuration controller 112. The TPM 114 manages and controls the escrow policy 118.

After the escrow period is initiated by the access configuration controller 112, one of at least 3 scenarios may occur:

1) the transferee entity 106 satisfies the conditions of the transaction, receives the private cryptographic key component 128a from the escrow, recomposes a copy of the private cryptographic key 124, and transmits an ownership instruction signed by the copy of the private cryptographic key 124 to the access configuration controller 112 before expiration of the escrow period (e.g., a validly signed instruction is received at the access configuration controller 112 before expiration of the escrow period);

2) the escrow entity 104 transmits the private cryptographic key component 128a to the transferor entity 102 because the transaction fails before expiration of the escrow period, the transferor entity 102 recomposes a copy of the private cryptographic key 124, and transmits an ownership instruction signed by the copy of the private cryptographic key 124 to the access configuration controller 112 during the escrow period; or 3) the escrow period expires.

Accordingly, during the escrow period defined by the escrow policy 118, the access configuration controller 112 awaits a communication (via a communications interface) from the transferor entity 102 or the transferee entity 106 and signed by the private cryptographic key 124. If a communication signed by the private cryptographic key 124 is received, then the possessor of the private cryptographic key 124 may assert "ownership" of the asset 110 by instructing the access configuration controller 112 to change the root of trust (e.g., the owner public cryptographic key 116) or utilize the public cryptographic key 126 as the new root of trust. Furthermore, the possessor may transmit access control change instructions to the access configuration controller 112 to change access records. It should be understood that the various parties may account for propagation delays in the escrow period.

If the escrow period expires before an instruction signed by the private cryptographic key 124 is received at the access configuration controller 112, then the TPM 114 reverts to the old RoT (e.g., the owner public cryptographic key 116), and the transferor entity uses the private cryptographic key 108 to control/manage the asset 110 via the access configuration controller 112. Such reversion is managed and controlled by the escrow policy 118, which is executed by the TPM 114. Accordingly, the transferor entity uses the private cryptographic key 108 to control and manage the asset 110 outside the escrow period, provided the ownership is not asserted by an entity during the escrow period.

In example of the asset 110 being a vehicle with cryptographically-controlled access, the access configuration controller 112 is embodied in a processing system including various security sub-systems. The owner of the vehicle communicates an escrow instruction signed by the private cryptographic key 108 to the access configuration controller 112 which identifies the escrow entity 104 and the buyer (e.g., the transferee entity 106). The parties receive the respective components of the generated private cryptographic key 124. If the transferee entity pays the transferor entity 102 according to the terms of the transaction, then the escrow entity 104 transmits the private cryptographic key component 128a to the transferee entity 106. The transferee entity 106 can thus assert control of the vehicle by communicating an ownership instruction (signed by the private cryptographic key 124) to the access configuration controller.

The described implementations allow secure transfer of cyber ownership of an asset. Use of the escrow entity acts as a neutral third party that helps with the transfer of ownership of the asset. During the escrow period, a single entity cannot assert ownership of the asset until one of the entities receives the other component of the decomposed key. In other words, both parts of the key are needed to assert ownership of the asset. The escrow entity is used to confirm (or deny) that the conditions of the transaction are satisfied (or not) during the escrow period. Furthermore, the transfer cryptographic key pair functions as a temporary ownership cryptographic key pair (temporary root of trust) during the escrow period controlled by the escrow policy.

During the escrow period, one or more additional polices may be associated with the cryptographic key pair 120 that limit functionality of and/or access to the asset during the escrow period. For example, the additional policies may define limited access to the asset 110 for the transferor entity. In an example of the asset 110 being a secured structure or building, the access configuration controller 112 is used to change security settings (e.g., levels of access by employees, access codes). During the escrow period, the escrow polices may limit the ability of the transferor entity 102 to change the security settings but allow the transferor entity to activate/deactivate the security system. Other functionality limitations are contemplated.

In the illustrated implementations, the private cryptographic key 124 is illustrated as being decomposed into two components and the components being transferred to three entities. It should be understood that the private cryptographic key 124 may be decomposed into more than two components, and the various components may be transmitted to three or more entities. The implementations may depend on the conditions of the transaction.

Further in the illustrated implementation, a new key pair is generated for the escrow period. However, it should be understood that the original key pair may be utilized for escrow. As such, an escrow policy is generated and linked to the original key pair responsive to receipt of the escrow policy. The private key of the original key pair is decomposed into components, which are transferred to the escrow entity 104 and the transferee entity 106. The components themselves may be controlled by the escrow policy and may expire when the escrow period expires.

Further in the illustrated implementation, the escrow process is described using asymmetric key techniques (e.g., using the key pair 120). However, it should be understood that the described implementations may be similarly applied using a symmetric key. In such an implementation, the symmetric key is decomposed, and the decomposed portions are shared between the entities as described. As such, instead of generating a key pair responsive to receipt of the escrow instruction, a symmetric key is generated. The symmetric key is stored as the owner key in the TPM 114 and also decomposed and shared to the entities. When an entity recomposes the key, the entity signs an ownership instruction with the symmetric key and transmits it to the TPM 114. The TPM 114 validates the instruction using the stored symmetric key. The remaining figures are described based on using a key pair, but it should be understood that FIGS. 2-8 may also use symmetric keys for escrow transactions.

Figure 2:
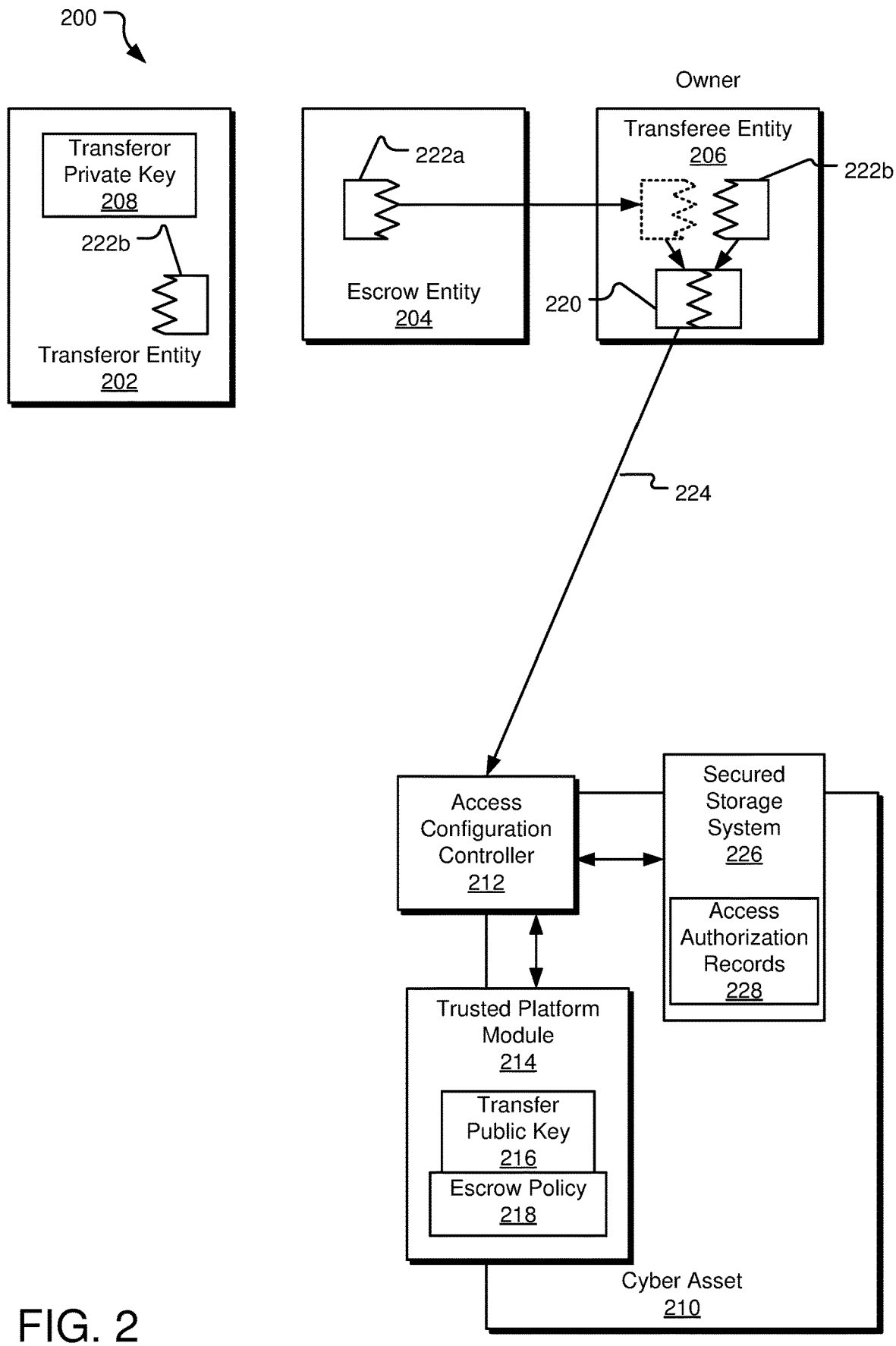
FIG. 2 illustrates another example system for transferring cyber ownership of a cyber asset using an escrow service.

FIG. 2 illustrates another example system 200 for transferring cyber ownership of a cyber asset 210 using an escrow service. Specifically, FIG. 2 illustrates scenario 1 described above, "the transferee entity satisfies the conditions of the transaction, receives the private cryptographic key component from the escrow, recomposes a copy of the private cryptographic key, and transmits an ownership instruction signed by the copy of the private cryptographic key to the access configuration controller before expiration of the escrow period."

Access or control of a cyber asset 210 is managed by a corresponding access configuration controller 212 using one or more cryptographic keys. The access configuration controller 212 accesses a memory that stores a transfer public cryptographic key 216. The transfer public cryptographic key 216 is cryptographically paired to a transfer private cryptographic key 220.

The transfer public cryptographic key 216 and the transfer private cryptographic key 220 were generated by a trusted platform module (TPM) 214 associated with the access configuration controller 212 responsive to a transferor entity 202 transmitting an escrow instruction to the access configuration controller 212 associated with the asset 210. Prior to transmitting the escrow instruction, the transferor entity 202 was considered the "cyber owner" of the asset 210 because the transferor entity 202 possessed the private cryptographic key (e.g., the transferor private cryptographic key 208) associated with a public cryptographic key stored in association with the access configuration controller 212. Access and control of the asset 210 was based on the transferor private cryptographic key 208. The owner of the transferor entity 202 is transferring cyber ownership of the asset 210 to the transferee entity 206 according to a transaction and using an escrow service that manages the escrow entity 204. The escrow instruction was validly signed by a transferor private cryptographic key 208 of the transferor entity 202 and included identification of the escrow entity 204 and the transferee entity 206 (e.g., using certificates identifying public cryptographic keys of each entity).

After generating the transfer cryptographic key pair (including the transfer public cryptographic key 216 and the transfer private cryptographic key 220), the access configuration controller 212 (e.g., via the TPM 214) decomposed the private cryptographic key 220 into a private cryptographic key component 222a and the private cryptographic key component 222b. The access configuration controller 212 securely communicated the private cryptographic key component 222a to the escrow entity 204 and the private cryptographic key component 222b to the transferor entity 202 and the transferee entity 206.

The transfer public cryptographic key 216 is associated with an escrow policy 218 that defines an escrow period. The private cryptographic key 220 and the public cryptographic key 216 are operable during the escrow period defined by the escrow policy 218. During the escrow period, the transfer public cryptographic key 216 may be referred to as the owner cryptographic key because a party that possesses the private cryptographic key 220 associated with the transfer public cryptographic key 216 may access/control (and assert ownership of) the asset 210. If conditions of the transaction are satisfied during the escrow period (based on a determination by the escrow entity 204), then the escrow entity 204 communicates the private cryptographic key component 222a to the transferee entity 206. The transferee entity 206 then uses both the private cryptographic key components to recompose the private cryptographic key 220. If the conditions of the transaction are not satisfied during the escrow period or the escrow entity 204 determines that the transferee entity 206 will not satisfy the conditions of the transaction, then the escrow entity 204 communicates the private cryptographic key component 222a to the transferor entity 202. The transferor entity 202 then uses both the private cryptographic key components to recompose the private cryptographic key 220. If the escrow period expires without a determination of whether or not conditions of the transaction are satisfied (or if a party fails to communicate the private cryptographic key 220 during the escrow period), then the asset is returned to the transferor entity 202. In other words, the access configuration controller 212 (via the TPM 214) restores the public cryptographic key associated with the transferor private cryptographic key 208 as the owner public cryptographic key.

In FIG. 2, the transferee entity 206 satisfies conditions of the transaction during the escrow period defined by the escrow policy 218. The conditions may be based upon payment, actions, etc. In some example implementations, the escrow service associated with the escrow entity 204 determines that the conditions of the transaction are satisfied. Further in some implementations, the escrow entity 204 determines that payments are received (conditions are satisfied) based on a smart contract executable by or in association with the escrow entity. Responsive to satisfying the conditions of the transactions during the escrow period, the escrow entity 204 securely communicates the private cryptographic key component 222a to the transferee entity 206. Secure communication may include encrypting the private cryptographic key component 222a using a public cryptographic key associated with the transferee entity 206.

The transferee entity 206 uses the private cryptographic key component 222a and 222b to recompose the private cryptographic key 220. The transferee entity transmits an ownership instruction 224 signed by the private cryptographic key 220 to the access configuration controller 212 during the escrow period. The access configuration controller receives and verifies the ownership instruction using the transfer public cryptographic key 216. Accordingly, the transferee entity 206 is verified as the owner of the cyber asset 210. The transferee entity 206 is able to access and control the asset 210 using the private cryptographic key 220. In some example implementations, the ownership instruction 224 includes a public cryptographic key associated with the transferee entity 206. Responsive to receipt of the ownership instruction, the access configuration controller 212 (via the TPM 214) processes the instruction and stores the public cryptographic key associated with the transferee entity 206 and received with the instruction as the ownership public cryptographic key. Thus, the transferee entity 206 is able to utilize a public cryptographic key of the entity's choosing.

The transferee entity 206 is further able to assert ownership by accessing access authorization records 228 in a secured storage system 226 using the recomposed cryptographic private key 220 or the private key asserted with the ownership instruction 224. The transferee entity 206 transmits an access control change instruction to the access configuration controller 212. The access configuration controller 212 uses the public cryptographic key (e.g., either the public cryptographic key 216 or the new public key communicated in the ownership instruction), which is referred to as the root of trust or the ownership public cryptographic key, to verify that the access control change instruction was validly signed by the private cryptographic key associated with the ownership public cryptographic key. In this manner, the access configuration controller 212 can be instructed to grant the transferee entity access to delete previous access authorization records 228 and to add a new access authorization record 228 for the transferee entity 206. Accordingly, the transferee entity 206 can establish cyber ownership of the cyber asset 210 because the transferee entity is the only entity recorded in the access authorization records 228 that is authorized to make subsequent changes to the access authorization records 228 (e.g., to authorize other entities, employees, etc. some level of access to and/or operation control of the asset.)

In one implementation, once the transferee entity 206 has been granted access to the access authorization records 228, the new entity can not only grant other entities some degree of access to or operation of the asset, but the new entity may also create new roles and operational limitation that may be attached to these roles. In the example of the cyber asset 210 being a vehicle, an example physical asset, the access configuration controller 212 and the access authorization records 228 may control access to a vehicle locking and/or ignition system, such that access to and/or operation of the cyber asset 210 is controlled by the access configuration controller 212. Different entities may even receive more limited permissions (e.g., the vehicle cannot be driven after dark by a particular entity) for the cyber asset.

Figure 3:
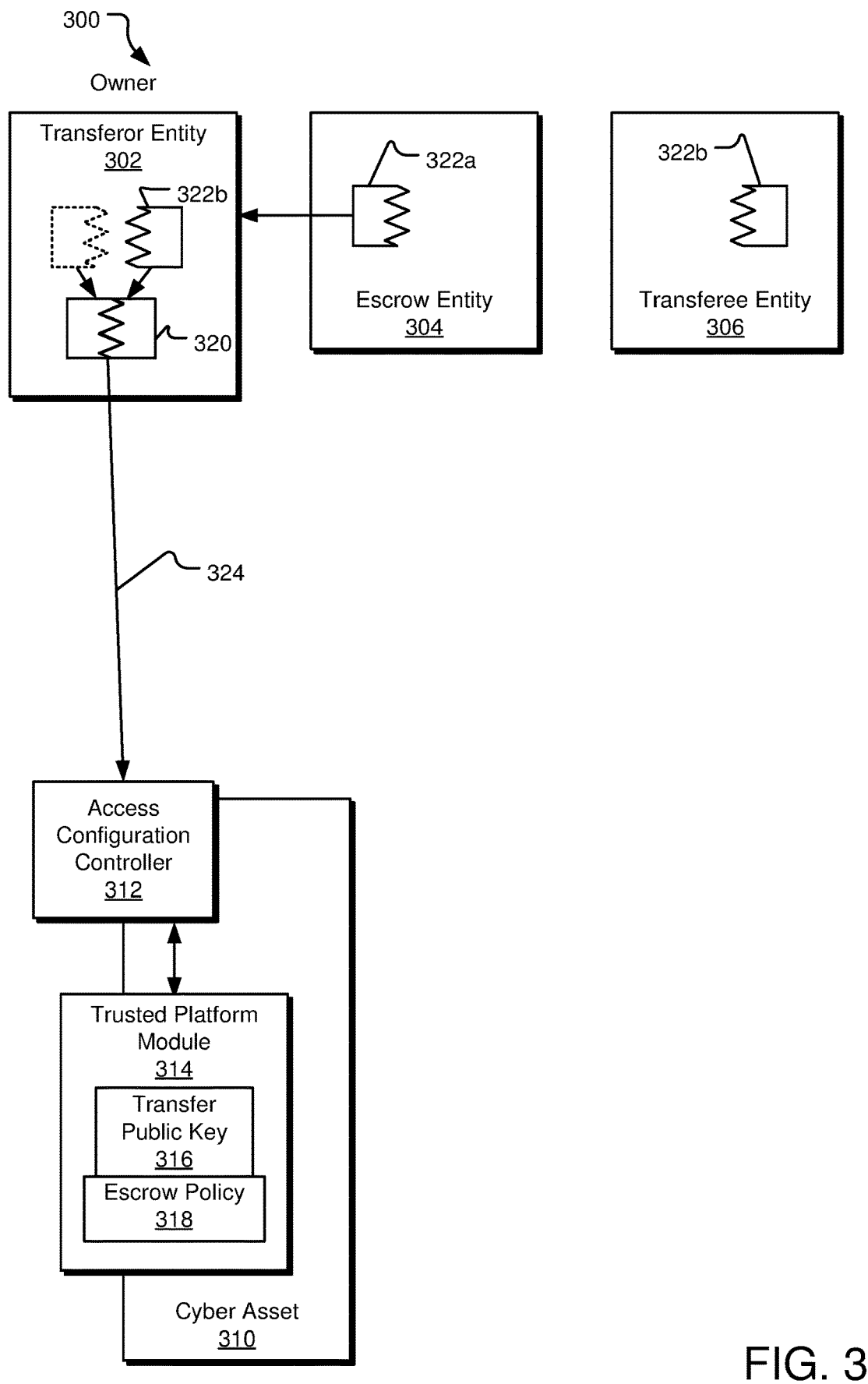
FIG. 3 illustrates another example system for transferring cyber ownership of a cyber asset using an escrow service.

FIG. 3 illustrates another example system 300 for transferring cyber ownership of a cyber asset 310 using an escrow service. Specifically, FIG. 3 illustrates scenario 2 described above, "the escrow entity transmits the private cryptographic key component to the transferor entity because the transaction fails before expiration of the escrow period, recomposes a copy of the private cryptographic key, and transmits an ownership instruction signed by the copy of the private cryptographic key to the access configuration controller during the escrow period."

Access or control of a cyber asset 310 is managed by a corresponding access configuration controller 312 using one or more cryptographic keys. The access configuration controller 312 has access to a memory that stores a transfer public cryptographic key 316. The transfer public cryptographic key 316 is cryptographically paired to a transfer private cryptographic key 320.

The transfer public cryptographic key 316 and the transfer private cryptographic key 320 were generated by a trusted platform module (TPM) 314 associated with the access configuration controller 312 responsive to a transferor entity 302 transmitting an escrow instruction to the access configuration controller 312 associated with the asset 310. Prior to transmitting the escrow instruction, the transferor entity 302 was considered the "cyber owner" of the asset 310 because the transferor entity 302 possessed the private cryptographic key (e.g., the transferor private cryptographic key) associated with a public cryptographic key stored in association with the access configuration controller 312. Access and control of the asset 310 was based on the transferor private cryptographic key. The owner of the transferor entity 302 is transferring cyber ownership of the asset 310 to the transferee entity 306 according to a transaction and using an escrow service that manages the escrow entity 304. The escrow instruction was validly signed by a transferor private cryptographic key of the transferor entity 302 and included identification of the escrow entity 304 and the transferee entity 306 (e.g., using certificates identifying public cryptographic keys of each entity).

After generating the transfer cryptographic key pair (including the transfer public cryptographic key 316 and the transfer private cryptographic key 320), the access configuration controller 312 (e.g., via the TPM 314) decomposed the private cryptographic key 320 into a private cryptographic key component 322a and the private cryptographic key component 322b. The access configuration controller 312 securely communicated the private cryptographic key component 322a to the escrow entity 304 and the private cryptographic key component 322b to the transferor entity 302 and the transferee entity 306.

The transfer public cryptographic key 316 is associated with an escrow policy 318 that defines an escrow period. The private cryptographic key 320 and the public cryptographic key 316 are operable during the escrow period defined by the escrow policy 318. During the escrow period, the transfer public cryptographic key 316 may be referred to as the owner cryptographic key because a party that possesses the private cryptographic key 320 associated with the transfer public cryptographic key 316 may access/control (and assert ownership of) the asset 310. If conditions of the transaction are satisfied during the escrow period (based on a determination by the escrow entity 304), then the escrow entity 304 communicates the private cryptographic key component 322a to the transferee entity 306. The transferee entity 306 then uses both the private cryptographic key components to generate the private cryptographic key 320. If the conditions of the transaction are not satisfied during the escrow period or the escrow entity 304 determines that the transferee entity 306 will not satisfy the conditions of the transaction, then the escrow entity 304 communicates the private cryptographic key component 322a to the transferor entity 302. The transferor entity 302 then uses both the private cryptographic key components to recompose/generate the private cryptographic key 320. If the escrow period expires without a determination of whether or not conditions of the transaction are satisfied (or if a party fails to communicate the private cryptographic key 320 during the escrow period), then the asset is returned to the transferor entity 302. In other words, the access configuration controller 312 (via the TPM 314) restores the public cryptographic key associated with the transferor private cryptographic key as the owner public cryptographic key.

In FIG. 3, the escrow entity 304 has determined that the transferee entity 306 will not satisfy the conditions of the transaction during the escrow period defined by the escrow policy 318. Such a determination may be based on the transferee entity 306 indicating to the escrow entity 304 that the transferee entity 306 will not satisfy the conditions of the transaction (e.g., based on failure to obtain funds). Other methods of determination of failure to meet the conditions during the escrow period are contemplated. Responsive to determining that the transferee entity 306 will not satisfy the conditions of the transaction, the escrow entity 304 transmits the private cryptographic key component 322a to the transferor entity 302 such that the transferor entity 302 can reclaim ownership of the asset 310 during the escrow period. The transferor entity 302 utilizes the private cryptographic key component 322a and 322b to recompose the private cryptographic key 320. The transferor entity 302 transmits, during the escrow period, an ownership instruction 324 to the access configuration controller 312 signed by the private cryptographic key 320. The access configuration controller 312 verifies the ownership instruction using the transferor public cryptographic key 316. Accordingly, the transferee entity 306 is verified as the owner of the cyber asset 310.

The transferee entity 306 accesses and controls the asset 310 using the private cryptographic key 320. In some example implementations, the ownership instruction includes a public cryptographic key associated with the transferor entity 302. Responsive to receipt of the ownership instruction, the access configuration controller 312 (via the TPM 314) processes the instruction and stores the public cryptographic key associated with the transferor entity 302 and received with the instruction as the ownership public cryptographic key. Thus, the transferee entity 306 is able to utilize a public cryptographic key of the entity's choosing. In some example implementations, the ownership instruction includes an instruction to revert to the previously used public cryptographic key as the owner public cryptographic key. As such, the transferor entity 302 may utilize the already possessed transferor private cryptographic key to access and control the asset 310.

Figure 4:
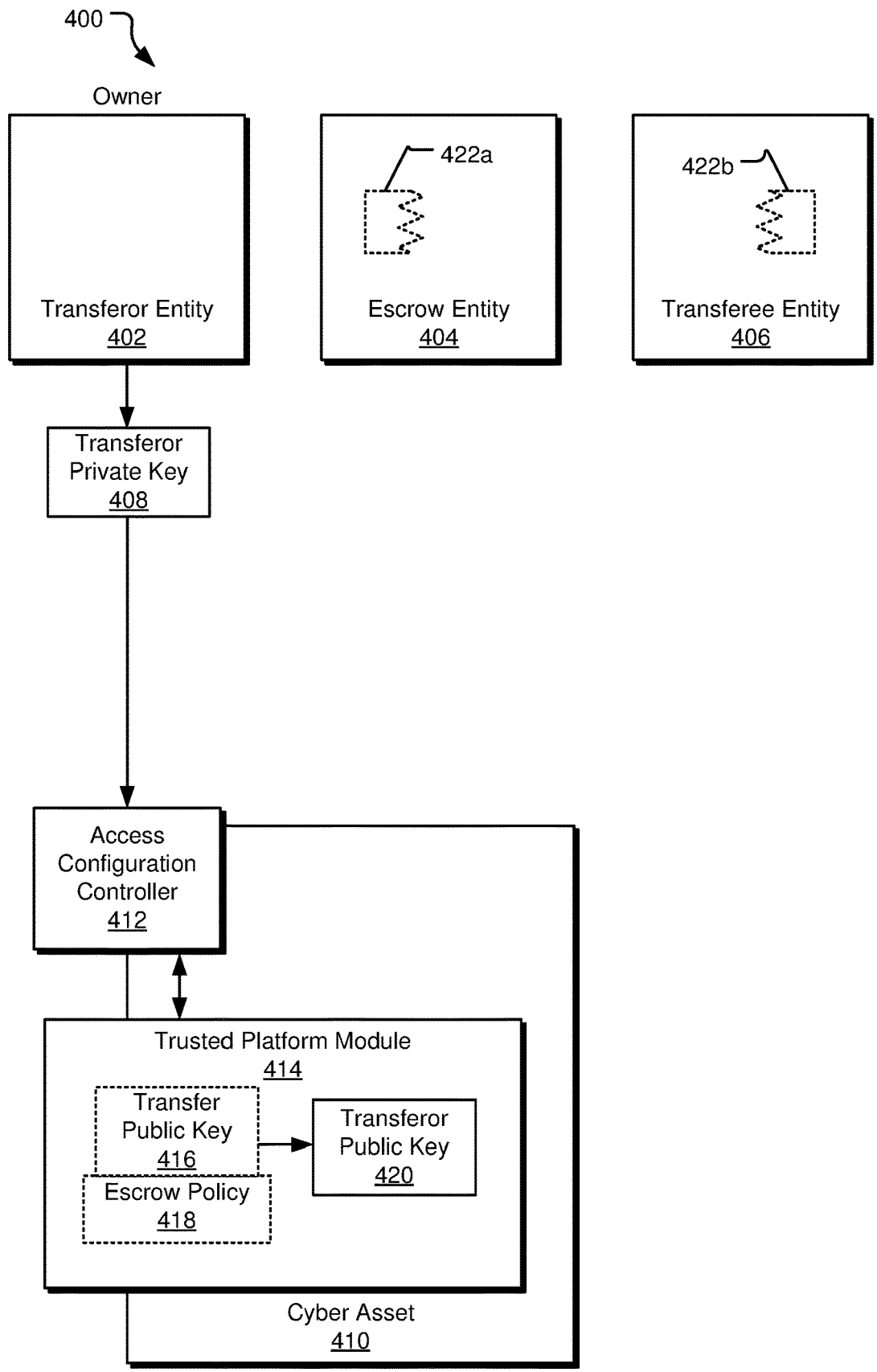
FIG. 4 illustrates another example system for transferring cyber ownership of a cyber asset using an escrow service.

FIG. 4 illustrates another example system 400 for transferring cyber ownership of a cyber asset 410 using an escrow service. Specifically, FIG. 4 illustrates scenario 3 described above, "the escrow period expires."

Access or control of a cyber asset 410 is managed by a corresponding access configuration controller 412 using one or more cryptographic keys. The access configuration controller 412 has access to a memory that stores a transfer public cryptographic key 416. The transfer public cryptographic key 416 is cryptographically paired to a transfer private cryptographic key.

The transfer public cryptographic key 416 and the transfer private cryptographic key were generated by a trusted platform module (TPM) 414 associated with the access configuration controller 412 responsive to a transferor entity 402 transmitting an escrow instruction to the access configuration controller 412 associated with the asset 410. Prior to transmitting the escrow instruction, the transferor entity 402 was considered the "cyber owner" of the asset 410 because the transferor entity 402 possessed the private cryptographic key (e.g., a transferor private cryptographic key 408) associated with a public cryptographic key stored in association with the access configuration controller 412. Access and control of the asset 410 was based on the transferor private cryptographic key 408. The owner of the transferor entity 402 is transferring cyber ownership of the asset 410 to the transferee entity 406 according to a transaction and using an escrow service that manages the escrow entity 404. The escrow instruction was validly signed by a transferor private cryptographic key 408 of the transferor entity 402 and included identification of the escrow entity 404 and the transferee entity 406 (e.g., using certificates identifying public cryptographic keys of each entity).

After generating the transfer cryptographic key pair (including the transfer public cryptographic key 416 and the transfer private cryptographic key), the access configuration controller 412 (e.g., via the TPM 414) decomposed the transfer private cryptographic key into a private cryptographic key component 422a and the private cryptographic key component 422b. The access configuration controller 412 securely communicated the private cryptographic key component 422a to the escrow entity 404 and the private cryptographic key component 422b to the transferor entity 402 and the transferee entity 406.

The transfer public cryptographic key 416 is associated with an escrow policy 418 that defines an escrow period. The transfer private cryptographic key and the transfer public cryptographic key 416 are operable during the escrow period defined by the escrow policy 418. During the escrow period, the transfer public cryptographic key 416 may be referred to as the owner cryptographic key because a party that possesses the private cryptographic key associated with the transfer public cryptographic key 416 may access/control (and assert ownership of) the asset 410. If conditions of the transaction are satisfied during the escrow period (based on a determination by the escrow entity 404), then the escrow entity 404 communicates the private cryptographic key component 422a to the transferee entity 406. The transferee entity 406 then uses both the private cryptographic key components to recompose the private cryptographic key. If the conditions of the transaction are not satisfied during the escrow period or the escrow entity 404 determines that the transferee entity 406 will not satisfy the conditions of the transaction, then the escrow entity 404 communicates the private cryptographic key component 422a to the transferor entity 402. The transferor entity 402 then uses both the private cryptographic key components 422a and 422b to recompose the private cryptographic key. If the escrow period expires without a determination of whether or not conditions of the transaction are satisfied (or if a party fails to communicate the private cryptographic key during the escrow period), then the asset is returned to the transferor entity 402. In other words, the access configuration controller 412 (via the TPM 414) restores the public cryptographic key associated with the transferor private cryptographic key 408 as the owner public cryptographic key.

In FIG. 4, the TPM 414 associated with the access configuration controller 412 determines that the escrow period defined by the escrow policy 418 is expired. Furthermore, no communication/instruction signed by the recomposed private cryptographic key is received before expiration of the escrow period. Responsive to determining that the escrow period is expired, a public cryptographic key associated with the transferor (e.g., a transferor public cryptographic key 420) is restored as the owner public cryptographic key (e.g., a prior public cryptographic key) in association with the access configuration controller 412. The transferor public cryptographic key 420 is cryptographically paired with a transferor private cryptographic key 408 (e.g., a prior private cryptographic key). The transferor entity 402 accesses and controls the asset 410 using various instructions signed by the private cryptographic key 408.

Furthermore, any communications/instructions signed by the transfer private cryptographic key cryptographically parried with the transfer public cryptographic key 416 are not validated by the access configuration controller 412. Any party that obtains the private cryptographic key components 422a and 422b to recompose the private cryptographic key may not utilize the recomposed private cryptographic key to control/access the asset. The escrow policy 418 is processed to restored the transferor public cryptographic key 420.

Figure 5:
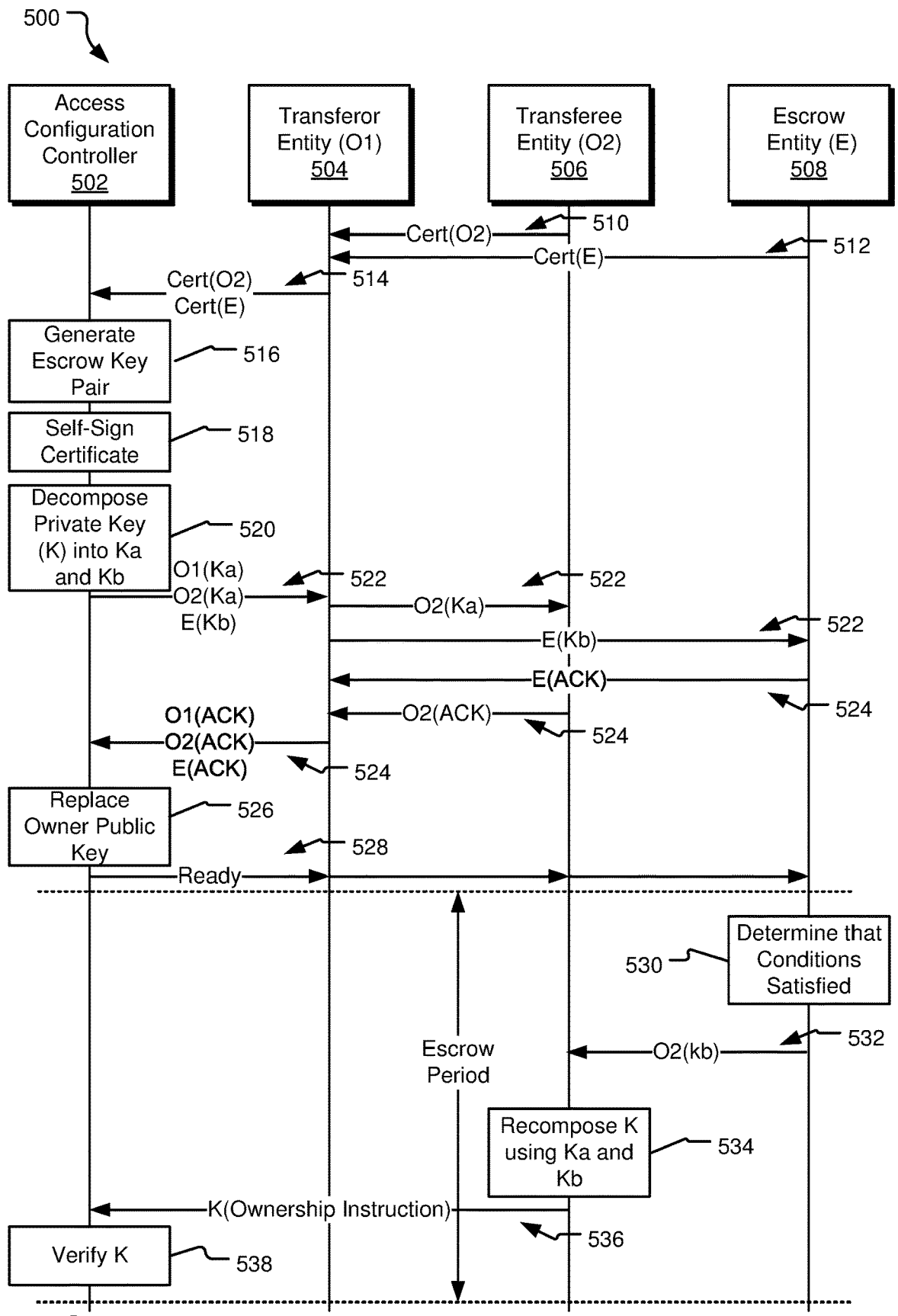
FIG. 5 illustrates example data sources and operations for transferring cyber ownership of a cyber asset using an escrow service.

FIG. 5 illustrates example data sources and operations 500 for transferring cyber ownership of a cyber asset using an escrow service. Specifically, FIG. 5 illustrates scenario 1 described above, "the transferee entity satisfies the conditions of the transaction, receives the private cryptographic key component from the escrow, recomposes a copy of the private cryptographic key, and transmits an ownership instruction signed by the copy of the private cryptographic key to the access configuration controller before expiration of the escrow period."

Access or control of a cyber asset (not shown) is managed by a corresponding access configuration controller 502 using one or more cryptographic keys. A transferor entity 504 ("owner 1" or "O1") is considered the "cyber owner" of the cyber asset because the transferor entity 504 controls a private cryptographic key cryptographically associated with a public cryptographic key (e.g., an owner cryptographic key) stored in association with the access configuration controller 502. The owner/controller of the transferor entity 504 is entering into a transaction to transfer cyber ownership of the cyber asset from the transferor entity 504 to a transferee entity ("owner 2" or "O2"). The transaction utilizes an escrow service controlling an escrow entity 508 ("escrow" or "E").

A communication 510 that includes a key certificate (Cert(O2)) of a cryptographic key pair of the transferee entity 506 is received by the transferor entity 504. The certificate validates the cryptographic key pair and includes the public cryptographic key of the cryptographic key pair associated with the transferee entity 506. A communication 512 that includes a key certificate (Cert(E)) of a cryptographic key pair of the escrow entity 508 is received by the transferor entity 504. The certificate validates the cryptographic key pair and includes the public cryptographic key of the cryptographic key pair associated with the transferee entity 506. The transferor entity 504 generates and transmits an escrow instruction 514 to the access configuration controller 502. The escrow instruction 514 includes the certificates (Cert (O2) and Cert(E)) and thus identifies the transferee entity 506 and the escrow entity 508 (e.g., using the public cryptographic keys of the entities). The escrow instruction may be signed by the private cryptographic key associated with the public cryptographic key stored in association with the access configuration controller 502. The escrow instruction may further include a parameter indicating an escrow period.

The access configuration controller 502 validates the escrow instruction using the public cryptographic key (e.g., the ownership key) and processes the escrow instruction. To process the escrow instruction, the access configuration controller 502 generates, in a generating operation 516 and using a trusted platform module associated with the access configuration controller 502, a new cryptographic key pair (a transfer cryptographic key pair) and signs (in a signing operation 518) a certificate for the generated transfer cryptographic key pair. The cryptographic key pair may be controlled by a policy defining the escrow period. The escrow period is received in the escrow instruction 514 or defined in the TPM associated with the access configuration controller 502. A decomposing operation 520 decomposes the private cryptographic key (K) of the generated transfer cryptographic key pair into at least a first private cryptographic key component (Ka) and a second private cryptographic key component (Kb).

The component Ka is duplicated and one copy of Ka is encrypted using the public cryptographic key of the transferor entity 504 (O1(Ka)). The second copy of Ka is encrypted using the public cryptographic key of the transferee entity 506 (O2(Ka)). The component Kb is encrypted using the public cryptographic key of the escrow entity (E(Kb)). The various encrypted components of the private cryptographic key are distributed to the various parties in communications 522. In the illustrated implementation, the components are transmitted to the parties via the transferor entity 504, which communicates the respective components to the transferee entity 506 and the escrow entity 508. In some example implementations, the components are communicated directly from the access configuration controller 502 to the respective entities. In communications 524, the various entities sign and transmit acknowledgement messages to the access configuration controller 502. For example, the escrow entity 508 signs an acknowledgment message (E(ACK)) with the private cryptographic key stored in association with the escrow entity 508 and transmits E(ACK) to the access configuration controller 502 via the transferor entity 504. In the illustrated implementation, the signed acknowledgment messages (E(ACK), O2(ACK), and O1(ACK)) are communicated to the access configuration controller 502 by the transferor entity 504, but it should be understood that the signed acknowledgment messages may be communicated directly to the access configuration controller from the respective entities.

The signed acknowledgement messages verify the entities' acceptance of the escrow conditions (e.g., the escrow period). If an entity does not agree with the escrow conditions, the entity does not send an acknowledgement message and the process ends. The transferor entity 504 may initiate a new transaction with a new escrow period. Furthermore, after transmission of the acknowledgement messages (or at another point in the process such as transmission 522), the escrow entity receives signed certificates of at least the transferee entity indicating the public key of the transferee entity 506. As such, the escrow entity is able to securely communicate the key component to the transferee entity 506 upon satisfaction of the conditions of the transaction.

Responsive to receiving the acknowledgement message, the access configuration controller 502 (via the TPM) initiates the escrow period by replacing 526 the owner public key (previously associated with a public cryptographic key of the transferor entity) with a transfer public cryptographic key of the generated transfer cryptographic key pair. At this point, the private cryptographic key is needed to access/control the asset associated with the access configuration controller. To gain access to the private cryptographic key, one of the entities (e.g., the transferor entity 504 or the transferee entity 506) needs both components Ka and Kb to recompose the private cryptographic key. Because the escrow entity 508 possesses the component Kb, the escrow entity controls whether the component Kb is communicated to the transferor entity 504 or the transferee entity 506 based on the conditions of the transaction. The access configuration controller 502 signs (e.g., using a private cryptographic key) and transmits a ready signal 528 to the entities and the escrow period is initiated.

The escrow entity determines 530 that the conditions of the transaction are satisfied. The determination may be based on a payment received at the escrow entity 508, performance of transactional requirements, etc. The escrow entity 508 decrypts the component Kb using the private cryptographic key associated with the public cryptographic key used to encrypt the component Kb. The escrow entity encrypts the component Kb using the public cryptographic key of the transferee entity 506 and communicates 532 the encrypted component Kb (O2(Kb)) to the transferee entity 506. The transferee entity 506 decrypts the components Ka and Kb and 508 recomposes 534 the private cryptographic key K using the components Ka and Kb. The transferee entity 506 generates and transmits an ownership instruction 536, which is signed by the recomposed key K, to the access configuration controller 502.

The access configuration controller verifies 538 the ownership instruction using the owner public cryptographic key. Because the ownership instruction is verified and received during the escrow period, the transferee entity uses the recomposed private cryptographic key K to access/control the asset via the access configuration controller 502. In some example implementations, the ownership instruction includes an indication of a new public cryptographic key cryptographically paired with a private cryptographic key stored with the transferee entity. Thus, the transferee entity 506 instructs the access configuration controller 502 to utilize the indicated key to verify subsequent access/control instructions.

The transferee entity 506 may further transmit access control change instructions to the access configuration controller 502. The access control change instruction is signed by the cryptographic key K or a new private key indicated in the ownership instruction, and the access configuration controller 502 verifies that the instruction is validly signed using the public cryptographic key (e.g., root of trust, ownership key). The access configuration controller 502 can be instructed to grant access to the access authorization records stored in the secure memory. Once access is granted to the transferee entity 506, the transferee can delete previous access authorization records and to add a new access authorization record. The transferee entity 506 can further grant other entities some degree of access to or operation of the asset and create new roles and operational limitations that may be attached to these roles.

Figure 6:
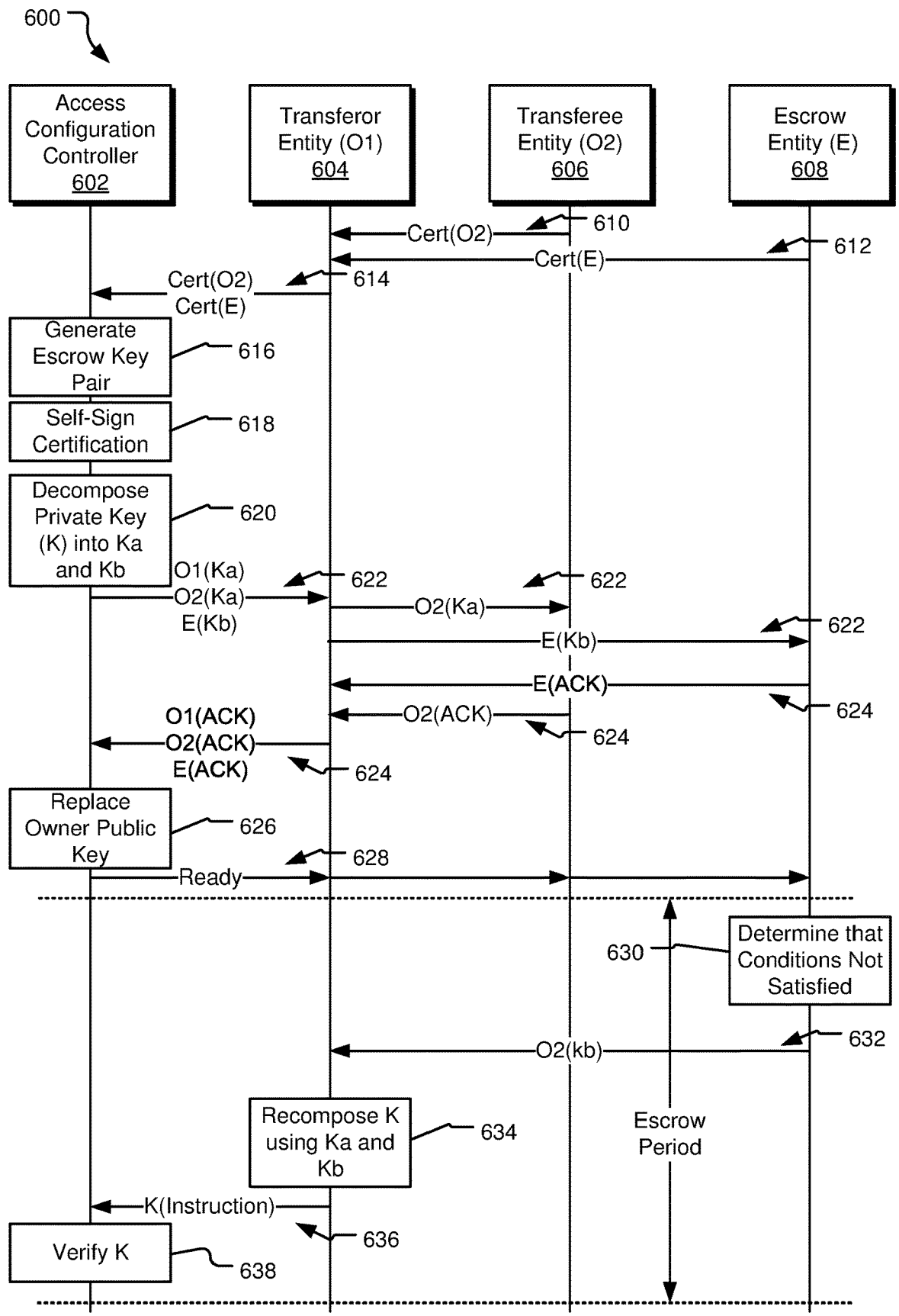
FIG. 6 illustrates example data sources and operations for transferring cyber ownership of a cyber asset using an escrow service.

FIG. 6 illustrates example data sources and operations 600 for transferring cyber ownership of a cyber asset using an escrow service. Specifically, FIG. 6 illustrates scenario 2 described above, "the escrow entity transmits the private cryptographic key component to the transferor entity because the transaction fails before expiration of the escrow period, recomposes a copy of the private cryptographic key, and transmits an ownership instruction signed by the copy of the private cryptographic key to the access configuration controller during the escrow period."

Access or control of a cyber asset (not shown) is managed by a corresponding access configuration controller 602 using one or more cryptographic keys. A transferor entity 604 ("owner 1" or "O1") is considered the "cyber owner" of the cyber asset because the transferor entity 604 controls a private cryptographic key cryptographically associated with a public cryptographic key (e.g., an owner cryptographic key) stored in association with the access configuration controller 602. The owner/controller of the transferor entity 604 is entering into a transaction to transfer cyber ownership of the cyber asset from the transferor entity 604 to a transferee entity ("owner 2" or "O2"). The cyber ownership transfer transaction utilizes an escrow service controlling an escrow entity 608 ("escrow" or "E").

A communication 610 that includes a key certificate (Cert(O2)) of a cryptographic key pair of the transferee entity 606 is received by the transferor entity 604. The certificate validates the cryptographic key pair and includes the public cryptographic key of the cryptographic key pair associated with the transferee entity 606. A communication 612 that includes a key certificate (Cert(E)) of a cryptographic key pair of the escrow entity 608 is received by the transferor entity 604. The certificate validates the cryptographic key pair and includes the public cryptographic key of the cryptographic key pair associated with the transferee entity 606. The transferor entity 604 generates and transmits an escrow instruction 614 to the access configuration controller 602. The escrow instruction 614 includes the certificates (Cert (O2) and Cert(E)) and thus identifies the transferee entity 606 and the escrow entity 608 (e.g., using the public cryptographic keys of the entities). The escrow instruction may be signed by the private cryptographic key associated with the public cryptographic key stored in association with the access configuration controller 602. The escrow instruction may further include a parameter indicating an escrow period.

The access configuration controller 602 validates the escrow instruction using the public cryptographic key (e.g., the ownership key) and processes the escrow instruction. To process the escrow instruction, the access configuration controller 602 generates, in a generating operation 616 and using a trusted platform module associated with the access configuration controller 602, a new cryptographic key pair (a transfer cryptographic key pair) and signs (in a signing operation 618) a certificate for the generated transfer cryptographic key pair. The cryptographic key pair may be controlled by a policy defining the escrow period. The escrow period is received in the escrow instruction 614 or defined in the TPM associated with the access configuration controller 602. A decomposing operation 620 decomposes the private cryptographic key (K) of the generated transfer cryptographic key pair into at least a first private cryptographic key component (Ka) and a second private cryptographic key component (Kb).

The component Ka is duplicated and one copy of Ka is encrypted using the public cryptographic key of the transferor entity 604 (O1(Ka)). The second copy of Ka is encrypted using the public cryptographic key of the transferee entity 606 (O2(Ka)). The component Kb is encrypted using the public cryptographic key of the escrow entity (E(Kb)). The various encrypted components of the private cryptographic key are distributed to the various parties in communications 622. In the illustrated implementation, the components are transmitted to the parties via the transferor entity 604, which communicates the respective components to the transferee entity 606 and the escrow entity 608. In some example implementations, the components are communicated directly from the access configuration controller 602 to the respective entities. In communications 624, the various entities sign and transmit acknowledgement messages to the access configuration controller 602. For example, the escrow entity 608 signs an acknowledgment message (E(ACK)) with the private cryptographic key stored in association with the escrow entity 608 and transmits E(ACK) to the access configuration controller 602 via the transferor entity 604. In the illustrated implementation, the signed acknowledgment messages (E(ACK), O2(ACK), and O1(ACK)) are communicated to the access configuration controller 602 by the transferor entity 604, but it should be understood that the singed acknowledgment messages may be communicated directly to the access configuration controller from the respective entities.

The signed acknowledgement messages verify the entities' acceptance of the escrow conditions (e.g., the escrow period). If an entity does not agree with the escrow conditions, the entity does not send an acknowledgement message and the process ends. The transferor entity 604 may initiate a new cyber ownership transfer transaction with a new escrow period.

Responsive to receiving the acknowledgement message, the access configuration controller 602 (via the TPM) initiates the escrow period by replacing 626 the owner public key (previously associated with a public cryptographic key of the transferor entity) with a transfer public cryptographic key of the generated transfer cryptographic key pair. At this point, the private cryptographic key is needed to access/control the asset associated with the access configuration controller. To gain access to the private cryptographic key, one of the entities (e.g., the transferor entity 604 or the transferee entity 606) needs both components Ka and Kb to recompose the private cryptographic key. Because the escrow entity 608 possesses the component Kb, the escrow entity controls whether the component Kb is communicated to the transferor entity 604 or the transferee entity 606 based on the conditions of the transaction. The access configuration controller 602 signs (e.g., using a private cryptographic key) and transmits a ready signal 628 to the entities and the escrow period is initiated.

The escrow entity determines 630 that the conditions of the transaction are not satisfied. The determination may be based an indication by the transferee entity 606 that the entity will not satisfy the conditions during the escrow period. The escrow entity 608 decrypts the component Kb using the private cryptographic key associated with the public cryptographic key used to encrypt the component Kb. The escrow entity encrypts the component Kb using the public cryptographic key of the transferor entity 604 and communicates 632 the encrypted component Kb (O2(Kb)) to the transferor entity 604. The transferor entity 604 decrypts the components Ka and Kb and recomposes 634 the private cryptographic key K using the components Ka and Kb. The transferor entity 604 reasserts ownership of the asset by generating and transmits an ownership instruction 636, which is signed by the recomposed key K, to the access configuration controller 602.

The access configuration controller verifies 638 the ownership instruction using the owner public cryptographic key. Because the ownership instruction is verified and received during the escrow period, the transferor entity 504 uses the recomposed private cryptographic key K to access/control the asset via the access configuration controller 602. In some example implementations, the ownership instruction includes an instruction to revert to the previous cryptographic key pair utilized before the escrow instruction 614.

Figure 7:
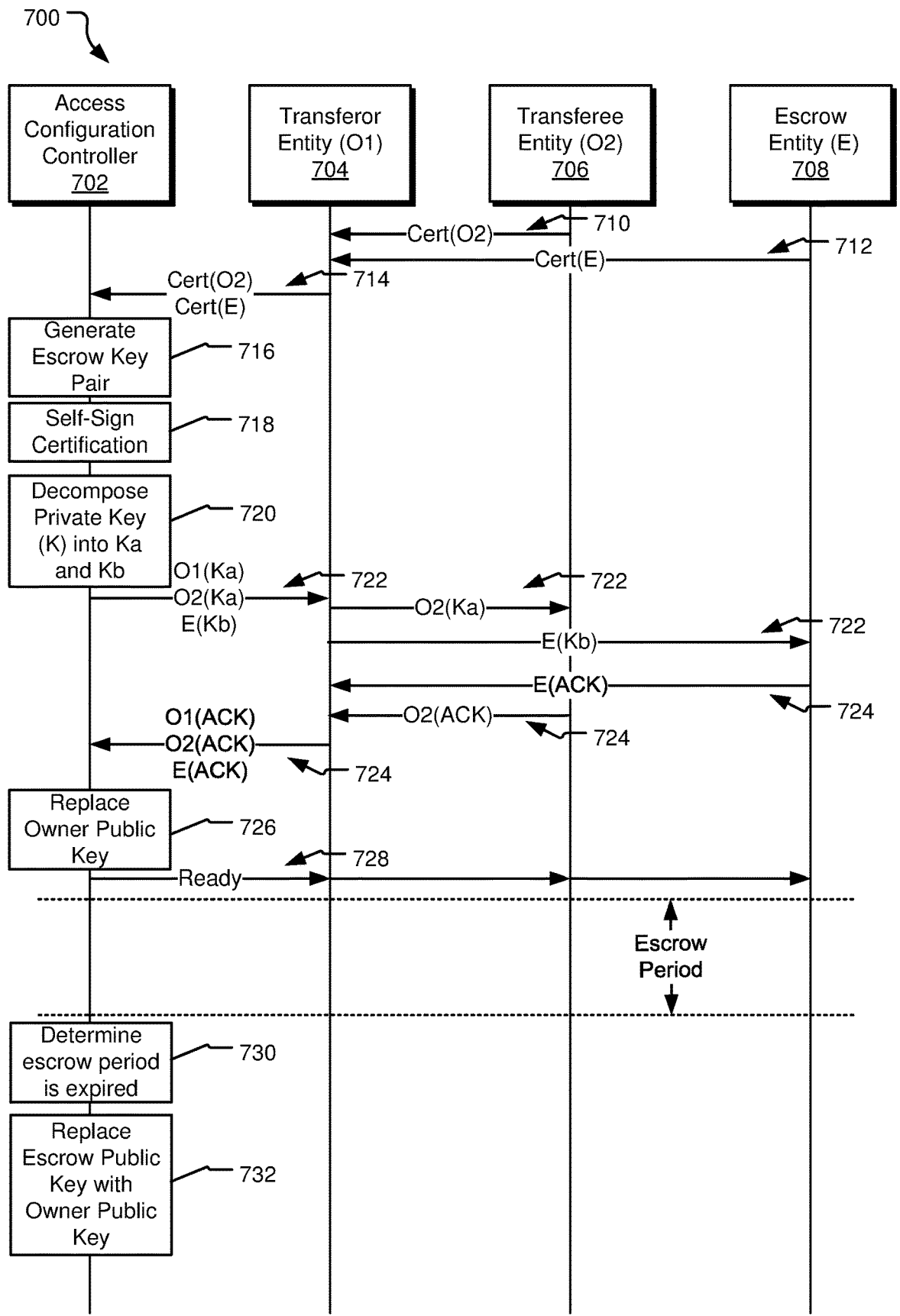
FIG. 7 illustrates example data sources and operations for transferring cyber ownership of a cyber asset using an escrow service.

FIG. 7 illustrates example data sources and operations 700 for transferring cyber ownership of a cyber asset using an escrow service. Specifically, FIG. 7 illustrates scenario 3 described above, "the escrow period expires."

Access or control of a cyber asset (not shown) is managed by a corresponding access configuration controller 702 using one or more cryptographic keys. A transferor entity 704 ("owner 1" or "O1") is considered the "cyber owner" of the cyber asset because the transferor entity 704 controls a private cryptographic key cryptographically associated with a public cryptographic key (e.g., an owner cryptographic key) stored in association with the access configuration controller 702. The owner/controller of the transferor entity 704 is entering into a transaction to transfer cyber ownership of the cyber asset from the transferor entity 704 to a transferee entity ("owner 2" or "O2"). The transaction utilizes an escrow service controlling an escrow entity 708 ("escrow" or "E").

A communication 710 that includes a key certificate (Cert(O2)) of a cryptographic key pair of the transferee entity 706 is received by the transferor entity 704. The certificate validates the cryptographic key pair and includes the public cryptographic key of the cryptographic key pair associated with the transferee entity 706. A communication 712 that includes a key certificate (Cert(E)) of a cryptographic key pair of the escrow entity 708 is received by the transferor entity 704. The certificate validates the cryptographic key pair and includes the public cryptographic key of the cryptographic key pair associated with the transferee entity 706. The transferor entity 704 generates and transmits an escrow instruction 714 to the access configuration controller 702. The escrow instruction 714 includes the certificates (Cert (O2) and Cert(E)) and thus identifies the transferee entity 706 and the escrow entity 708 (e.g., using the public cryptographic keys of the entities). The escrow instruction may be signed by the private cryptographic key associated with the public cryptographic key stored in association with the access configuration controller 702. The escrow instruction may further include a parameter indicating an escrow period.

The access configuration controller 702 validates the escrow instruction using the public cryptographic key (e.g., the ownership key) and processes the escrow instruction. To process the escrow instruction, the access configuration controller 702 generates, in a generating operation 716 and using a trusted platform module associated with the access configuration controller 702, a new cryptographic key pair (a transfer cryptographic key pair) and signs (in a signing operation 718) a certificate for the generated transfer cryptographic key pair. The cryptographic key pair may be controlled by a policy defining the escrow period. The escrow period is received in the escrow instruction 714 or defined in the TPM associated with the access configuration controller 702. A decomposing operation 720 decomposes the private cryptographic key (K) of the generated transfer cryptographic key pair into at least a first private cryptographic key component (Ka) and a second private cryptographic key component (Kb).

The component Ka is duplicated and one copy of Ka is encrypted using the public cryptographic key of the transferor entity 704 (O1(Ka)). The second copy of Ka is encrypted using the public cryptographic key of the transferee entity 706 (O2(Ka)). The component Kb is encrypted using the public cryptographic key of the escrow entity (E(Kb)). The various encrypted components of the private cryptographic key are distributed to the various parties in communications 722. In the illustrated implementation, the components are transmitted to the parties via the transferor entity 704, which communicates the respective components to the transferee entity 706 and the escrow entity 708. In some example implementations, the components are communicated directly from the access configuration controller 702 to the respective entities. In communications 724, the various entities sign and transmit acknowledgement messages to the access configuration controller 702. For example, the escrow entity 708 signs an acknowledgment message (E(ACK)) with the private cryptographic key stored in association with the escrow entity 708 and transmits E(ACK) to the access configuration controller 702 via the transferor entity 704. In the illustrated implementation, the signed acknowledgment messages (E(ACK), O2(ACK), and O1(ACK)) are communicated to the access configuration controller 702 by the transferor entity 704, but it should be understood that the signed acknowledgment messages may be communicated directly to the access configuration controller from the respective entities.

The signed acknowledgement messages verify the entities' acceptance of the escrow conditions (e.g., the escrow period). If an entity does not agree with the escrow conditions, the entity does not send an acknowledgement message and the process ends. The transferor entity 704 may initiate a new transaction with a new escrow period.

Responsive to receiving the acknowledgement message, the access configuration controller 702 (via the TPM) initiates the escrow period by replacing 726 the owner public key (previously associated with a public cryptographic key of the transferor entity) with a transfer public cryptographic key of the generated transfer cryptographic key pair. At this point, the private cryptographic key is needed to access/control the asset associated with the access configuration controller. To gain access to the private cryptographic key, one of the entities (e.g., the transferor entity 704 or the transferee entity 706) needs both components Ka and Kb to recompose the private cryptographic key. Because the escrow entity 708 possesses the component Kb, the escrow entity controls whether the component Kb is communicated to the transferor entity 704 or the transferee entity 706 based on the conditions of the transaction. The access configuration controller 702 signs (e.g., using a private cryptographic key) and transmits a ready signal 728 to the entities and the escrow period is initiated.

In FIG. 7, the escrow period expires before either entity (e.g., the transferor entity 704 or the transferee entity 706 is able to recompose the private cryptographic key using the key components Ka and Kb. In one example scenario, the transferee fails to transmit payment to the escrow entity 708 (or an associated party) before expiration of the escrow period. Because the escrow period is expired, cyber ownership of the asset is returned to the transferor entity 704. To return cyber ownership to the transferor entity 704, the access configuration controller (e.g., via the associated TPM) determines 730 that the escrow period is expired. The access configuration controller (e.g., via the associated TPM) replaces 732 the transfer public cryptographic key (expired) with the public cryptographic key associated with the transferor entity 704, which was utilized prior to the escrow process. The transferor entity 704 utilizes the transferor private cryptographic key to sign and transmit messages/instructions to gain access/control of the asset. The transferor entity 704 may initiate another escrow process using an escrow instruction.

Figure 8:
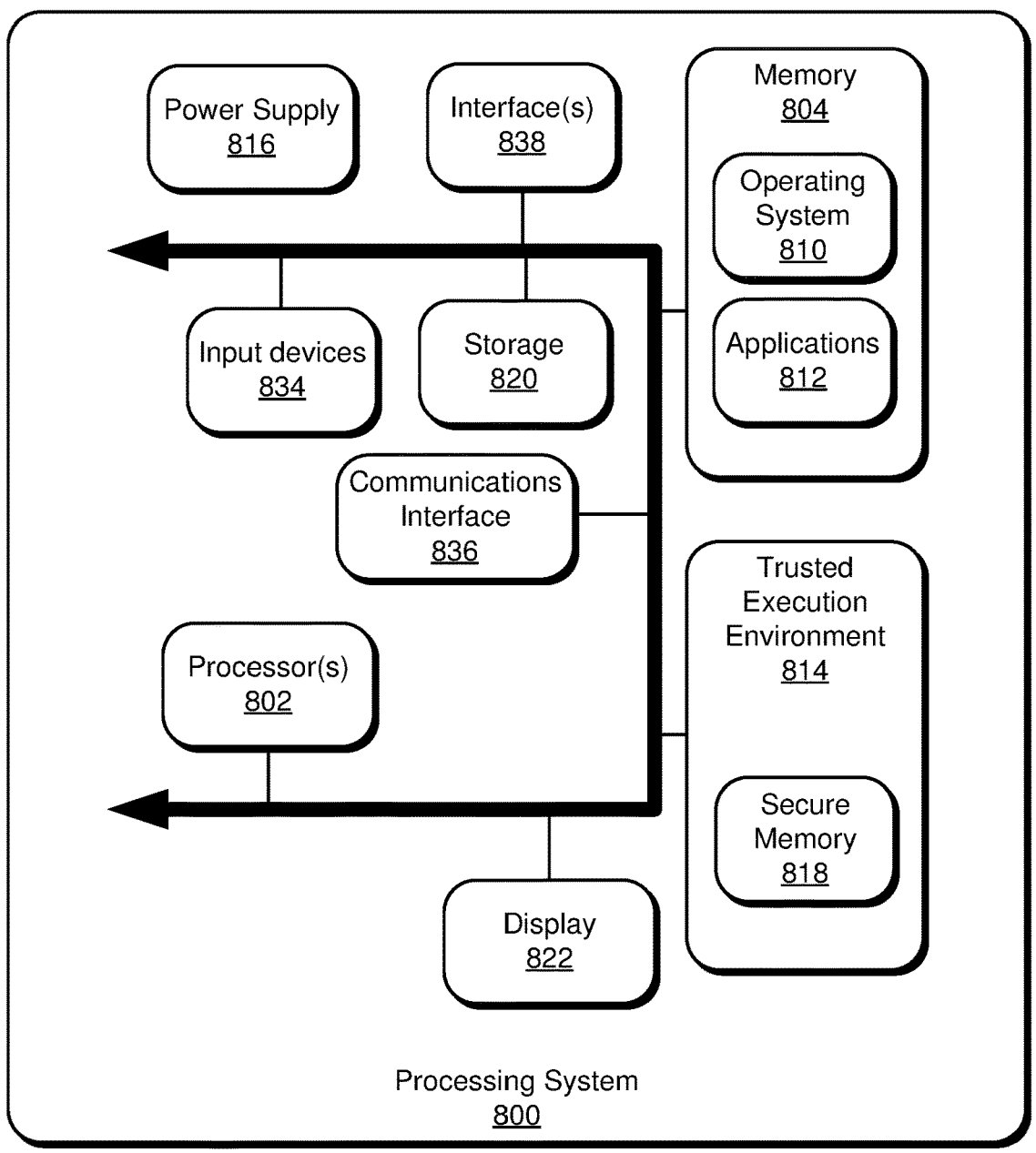
FIG. 8 illustrates an example system that may be useful in implementing the described technology.

FIG. 8 illustrates an example system (labeled as a processing system 800) that may be useful in implementing the described technology. The processing system may be a client device such as a laptop, mobile device, desktop, tablet, or a server/cloud device. The processing system 800 includes one or more processor(s) 802, and a memory 804. The memory 804 generally includes both volatile memory (e.g., RAM) and non-volatile memory (e.g., flash memory). An operating system 810 resides in the memory 804 and is executed by the processor(s) 802. The processing system 800 can also include a trusted execution environment (TEE) device 814 with secure memory 818. The secure memory 818 may be used to store, without limitation, access authorization records and/or cryptographic keys.

One or more application programs 812 modules or segments, such as components of a trusted execution environment 814 are loaded in the memory 804, the secure memory 818, and/or the storage 820 and executed by the processor(s) 802. Data such as cryptographic keys, access authorization records, access control change instructions, ownership instructions, escrow instructions, certificates, and access control parameters may be stored in the memory 804, the secure memory 818, or the storage 820 and may be retrievable by the processor(s) 802 for use managing access to a cyber asset. The storage 820 may be local to the processing system 800 or may be remote and communicatively connected to the processing system 800 and may include another server. The storage 820 may store resources that are requestable by client devices (not shown).

The processing system 800 includes a power supply 816, which is powered by one or more batteries or other power sources and which provides power to other components of the processing system 800. The power supply 816 may also be connected to an external power source that overrides or recharges the built-in batteries or other power sources.

The processing system 800 may include one or more communications interface 836 to provide network and device connectivity (e.g., mobile phone network, Wi-Fi®, Bluetooth®, etc.) to one or more other servers and/or client devices/entities (e.g., mobile devices, desktop computers, or laptop computers, USB devices). The processing system 800 may use the communications interface 836 and any other types of communication devices for establishing connections over a wide-area network (WAN) or local-area network (LAN). It should be appreciated that the network connections shown are exemplary and that other communications devices and means for establishing a communications link between the processing system 800 and other devices may be used.

The processing system 800 may include one or more input devices 834 such that a user may enter commands and information (e.g., a keyboard or mouse). These and other input devices may be coupled to the server by one or more interfaces 838 such as a serial port interface, parallel port, universal serial bus (USB), etc. The processing system 800 may further include a display 822 such as a touch screen display.

The processing system 800 may include a variety of tangible processor-readable storage media and intangible processor-readable communication signals. Tangible processor-readable storage can be embodied by any available media that can be accessed by the processing system 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system includes a communications interface configured to receive an escrow instruction from a first entity, the escrow instruction identifying an escrow entity and a second entity. The system further includes an access configuration controller controlling access to at least one asset, coupled to the communication interface, and including a secure platform device. The secure platform device is configured to generate a transfer cryptographic key responsive to receipt of the escrow instruction. The transfer cryptographic key controlled by a policy encoding an escrow period. The secure platform device is further configured to decompose the transfer cryptographic key into at least a first cryptographic key component and a second cryptographic key component. The communications interface is further configured to distribute the first cryptographic key component to the escrow entity and the second cryptographic key component to the second entity and to receive an ownership instruction. The secure platform device is further configured to verify whether the ownership instruction received during the escrow period is validly signed. The received ownership instruction is validly signed when the ownership instruction is signed by a copy of the transfer cryptographic key recomposed using the first cryptographic key component and the second cryptographic key component and invalidly signed when not signed by the copy of the transfer cryptographic key.

Another example system of any preceding system further includes the secure platform device being further configured to verify whether an ownership instruction received outside the escrow period is validly signed, the ownership instruction received outside the escrow period being validly signed when signed by a prior cryptographic key associated with the first entity.

Another example system of any preceding system further includes the transfer cryptographic key being a private cryptographic key paired with a public cryptographic key accessible by the secure platform device. The secure platform device uses the public cryptographic key to verify whether the received ownership instruction is validly signed during the escrow period.

Another example system of any preceding system further includes the received ownership instruction being received during the escrow period and is signed by the copy of the transfer cryptographic key recomposed using the first cryptographic key component and the second cryptographic key component. The received ownership instruction includes an identification of a new cryptographic key, and the secure platform device is further configured to verify whether subsequently received instructions are validly signed wherein the verification uses the new cryptographic key.

Another example system of any preceding system further includes the policy controlling the generated transfer cryptographic key further limiting access to the asset during the escrow period.

Another example system of any preceding system further includes the communications interface being further configured to distribute the second cryptographic key component to the first entity.

An example method includes generating a transfer cryptographic key responsive to receipt of an escrow instruction at an access configuration controller controlling access to the asset, the escrow instruction received from a first entity and identifying an escrow entity and a second entity, the generated transfer cryptographic being controlled by a policy encoding an escrow period. The method further includes decomposing the transfer cryptographic key into at least a first cryptographic key component and a second cryptographic key component, distributing the first cryptographic key component to the escrow entity and the second cryptographic key component to the second entity, and verifying whether an ownership instruction received during the escrow period is validly signed. The received ownership instruction is validly signed when the ownership instruction is signed by a copy of the transfer cryptographic key recomposed using the first cryptographic key component and the second cryptographic key component. The received ownership instruction is invalidly signed when not signed by the copy of the transfer cryptographic key.

Another example method of any preceding method further includes verifying whether an ownership instruction received outside the escrow period is validly signed, the ownership instruction received outside the escrow period being validly signed when signed by a prior cryptographic key associated with the first entity.

Another example method of any preceding method further includes the transfer cryptographic key being a private cryptographic key paired with a public cryptographic key used to verify whether the received ownership instruction is validly signed during the escrow period.

Another example method of any preceding method further includes the received ownership instruction being received during the escrow period and being signed by the copy of the transfer cryptographic key recomposed using the first cryptographic key component and the second cryptographic key component, and the received ownership instruction includes an identification of a new cryptographic key. The method further includes verifying whether subsequently received instructions are validly signed, the verification using the new cryptographic key.

Another example method of any preceding method further includes receiving one or more acknowledgement messages, the one or more acknowledgment messages indicating receipt of at least one of the first cryptographic key component by the escrow entity and the second cryptographic key component by the second entity.

Another example method of any preceding method further includes the one or more acknowledgement messages further indicating acceptance of at least the escrow period encoded in the policy by at least one of the escrow entity and the second entity.

Another example method of any preceding method further includes distributing the second cryptographic key component to the first entity.

Another example method of any preceding method further includes access to the asset being managed according to one or more access authorization records stored in a storage system secured by the access configuration controller. The method further includes receiving from the second entity an access control change instruction signed by the copy of the transfer cryptographic key recomposed using the first cryptographic key component and the second cryptographic key component, verifying a valid signing of the access control change instruction b using the transfer cryptographic key, and altering, by the access configuration controller, the one or more access authorization records according to the access control change instruction, responsive to verification of the valid signing of the access control change instruction.

An example one or more tangible processor-readable storage media embodied with instructions for executing on one or more processors and circuits of a device a process for managing access to an asset includes generating a transfer cryptographic key responsive to receipt of an escrow instruction at an access configuration controller controlling access to the asset, the escrow instruction received from a first entity and identifying an escrow entity and a second entity, the generated transfer cryptographic key being controlled by a policy encoding an escrow period. The process further includes decomposing the transfer cryptographic key into at least a first cryptographic key component and a second cryptographic key component, distributing the first cryptographic key component to the escrow entity and the second cryptographic key component to the second entity, and verifying whether an ownership instruction received during the escrow period is validly signed. The ownership instruction is validly signed when signed by a copy of the transfer cryptographic key recomposed using the first cryptographic key component and the second cryptographic key component and invalidly signed when not signed by the copy of the transfer cryptographic key.

Another example of one or more tangible processor-readable storage media embodied with instructions for executing, on one or more processors and circuits of a device, a process of any of the preceding processes includes verifying whether an ownership instruction received outside the escrow period is validly signed, the ownership instruction received outside the escrow period being validly signed when signed by a prior cryptographic key associated with the first entity.

Another example of one or more tangible processor-readable storage media embodied with instructions for executing, on one or more processors and circuits of a device, a process of any of the preceding processes includes the transfer cryptographic key being a private cryptographic key paired with a public cryptographic key accessible by the secure platform device, the secure platform device using the public cryptographic key to verify whether the received ownership instruction is validly signed during the escrow period.

Another example of one or more tangible processor-readable storage media embodied with instructions for executing, on one or more processors and circuits of a device, a process of any of the preceding processes includes the received ownership instruction being received during the escrow period and is signed by the copy of the transfer cryptographic key recomposed using the first cryptographic key component and the second cryptographic key component, the received ownership instruction including an identification of a new cryptographic key. The process further includes verifying whether subsequently received instructions are validly signed, the verification using the new cryptographic key.

Another example of one or more tangible processor-readable storage media embodied with instructions for executing, on one or more processors and circuits of a device, a process of any of the preceding processes includes access to the asset being managed according to one or more access authorization records stored in a storage system secured by the access configuration. The process further includes receiving from the second entity an access control change instruction signed by the copy of the transfer cryptographic key recomposed using the first cryptographic key component and the second cryptographic key component, verifying a valid signing of the access control change instruction using of the transfer cryptographic key, and altering, by the access configuration controller, the one or more access authorization records according to the access control change instruction, responsive to verification of the valid signing of the access control change instruction.

Another example of one or more tangible processor-readable storage media embodied with instructions for executing, on one or more processors and circuits of a device, a process of any of the preceding processes includes distributing the second cryptographic key component to the first entity.

An example system includes means for generating a transfer cryptographic key responsive to receipt of an escrow instruction at an access configuration controller controlling access to the asset, the escrow instruction received from a first entity and identifying an escrow entity and a second entity, the generated transfer cryptographic being controlled by a policy encoding an escrow period. The system further includes means for decomposing the transfer cryptographic key into at least a first cryptographic key component and a second cryptographic key component, distributing the first cryptographic key component to the escrow entity and the second cryptographic key component to the second entity, and verifying whether an ownership instruction received during the escrow period is validly signed. The received ownership instruction is validly signed when the ownership instruction is signed by a copy of the transfer cryptographic key recomposed using the first cryptographic key component and the second cryptographic key component. The received ownership instruction is invalidly signed when not signed by the copy of the transfer cryptographic key.

Another example system of any preceding system further includes means for verifying whether an ownership instruction received outside the escrow period is validly signed, the ownership instruction received outside the escrow period being validly signed when signed by a prior cryptographic key associated with the first entity.

Another example system of any preceding system further includes means for the transfer cryptographic key being a private cryptographic key paired with a public cryptographic key used to verify whether the received ownership instruction is validly signed during the escrow period.

Another example system of any preceding system further includes means for the received ownership instruction being received during the escrow period and being signed by the copy of the transfer cryptographic key recomposed using the first cryptographic key component and the second cryptographic key component, and the received ownership instruction includes an identification of a new cryptographic key. The system further includes means for verifying whether subsequently received instructions are validly signed, the verification using the new cryptographic key.

Another example system of any preceding system further includes means for receiving one or more acknowledgement messages, the one or more acknowledgment messages indicating receipt of at least one of the first cryptographic key component by the escrow entity and the second cryptographic key component by the second entity.

Another example system of any preceding system further includes means for the one or more acknowledgement messages further indicating acceptance of at least the escrow period encoded in the policy by at least one of the escrow entity and the second entity.

Another example system of any preceding system further includes means for distributing the second cryptographic key component to the first entity.

Another example system of any preceding system further includes means for access to the asset being managed according to one or more access authorization records stored in a storage system secured by the access configuration controller. The system further includes means for receiving from the second entity an access control change instruction signed by the copy of the transfer cryptographic key recomposed using the first cryptographic key component and the second cryptographic key component, verifying a valid signing of the access control change instruction by using the transfer cryptographic key, and altering, by the access configuration controller, the one or more access authorization records according to the access control change instruction, responsive to verification of the valid signing of the access control change instruction.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system comprising:
a communications interface configured to receive an escrow instruction from a first entity, the escrow instruction identifying an escrow entity and a second entity; and
an access configuration controller controlling access to at least one asset, coupled to the communication interface, and including a secure platform device, the secure platform device configured to generate a transfer cryptographic key responsive to receipt of the escrow instruction, the transfer cryptographic key controlled by a policy encoding an escrow period, the secure platform device further configured to decompose the transfer cryptographic key into at least a first cryptographic key component and a second cryptographic key component,
the communications interface being further configured to distribute the first cryptographic key component to the escrow entity and the second cryptographic key component to the second entity and to receive an ownership instruction,
the secure platform device being further configured to verify whether the ownership instruction received during the escrow period is validly signed, the received ownership instruction being validly signed when the ownership instruction is signed by a copy of the transfer cryptographic key recomposed using the first cryptographic key component and the second cryptographic key component, the ownership instruction being invalidly signed when not signed by the copy of the transfer cryptographic key.

2. The system of claim 1 wherein the secure platform device is further configured to verify whether an ownership instruction received outside the escrow period is validly signed, the ownership instruction received outside the escrow period being validly signed when signed by a prior cryptographic key associated with the first entity.

3. The system of claim 1 wherein the transfer cryptographic key is a private cryptographic key paired with a public cryptographic key accessible by the secure platform device, the secure platform device using the public cryptographic key to verify whether the received ownership instruction is validly signed during the escrow period.

4. The system of claim 1 wherein the received ownership instruction is received during the escrow period and is signed by the copy of the transfer cryptographic key recomposed using the first cryptographic key component and the second cryptographic key component, the received ownership instruction including an identification of a new cryptographic key and the secure platform device is further configured to verify whether subsequently received instructions are validly signed, the verification using the new cryptographic key.

5. The system of claim 1 wherein the policy controlling the generated transfer cryptographic key further limits access to the asset during the escrow period.

6. The system of claim 1 wherein the communications interface is further configured to distribute the second cryptographic key component to the first entity.

7. A method for managing access to an asset comprising:
generating a transfer cryptographic key responsive to receipt of an escrow instruction at an access configuration controller controlling access to the asset, the escrow instruction received from a first entity and identifying an escrow entity and a second entity, the generated transfer cryptographic being controlled by a policy encoding an escrow period;
decomposing the transfer cryptographic key into at least a first cryptographic key component and a second cryptographic key component;
distributing the first cryptographic key component to the escrow entity and the second cryptographic key component to the second entity; and
verifying whether an ownership instruction received during the escrow period is validly signed, the received ownership instruction being validly signed when the ownership instruction is signed by a copy of the transfer cryptographic key recomposed using the first cryptographic key component and the second cryptographic key component, the received ownership instruction being invalidly signed when not signed by the copy of the transfer cryptographic key.

8. The method of claim 7 further comprising:
verifying whether an ownership instruction received outside the escrow period is validly signed, the ownership instruction received outside the escrow period being validly signed when signed by a prior cryptographic key associated with the first entity.

9. The method of claim 7 wherein the transfer cryptographic key is a private cryptographic key paired with a public cryptographic key used to verify whether the received ownership instruction is validly signed during the escrow period.

10. The method of claim 7 wherein the received ownership instruction is received during the escrow period and is signed by the copy of the transfer cryptographic key recomposed using the first cryptographic key component and the second cryptographic key component, the received ownership instruction including an identification of a new cryptographic key and further comprising:
verifying whether subsequently received instructions are validly signed, the verification using the new cryptographic key.

11. The method of claim 7 further comprising:
receiving one or more acknowledgement messages, the one or more acknowledgment messages indicating receipt of at least one of the first cryptographic key component by the escrow entity and the second cryptographic key component by the second entity.

12. The method of claim 11 wherein the one or more acknowledgement messages further indicate acceptance of at least the escrow period encoded in the policy by at least one of the escrow entity and the second entity.

13. The method of claim 7 further comprising:
distributing the second cryptographic key component to the first entity.

14. The method of claim 7 wherein access to the asset is managed according to one or more access authorization records stored in a storage system secured by the access configuration controller and further comprising:
receiving from the second entity an access control change instruction signed by the copy of the transfer cryptographic key recomposed using the first cryptographic key component and the second cryptographic key component;
verifying a valid signing of the access control change instruction by using the transfer cryptographic key; and
altering, by the access configuration controller, the one or more access authorization records according to the access control change instruction, responsive to verification of the valid signing of the access control change instruction.

15. One or more tangible processor-readable storage media embodied with instructions for executing on one or more processors and circuits of a device a process for managing access to an asset comprising:
- generating transfer cryptographic key responsive to receipt of an escrow instruction at an access configuration controller controlling access to the asset, the escrow instruction received from a first entity and identifying an escrow entity and a second entity, the generated transfer cryptographic key being controlled by a policy encoding an escrow period;
- decomposing the transfer cryptographic key into at least a first cryptographic key component and a second cryptographic key component;
- distributing the first cryptographic key component to the escrow entity and the second cryptographic key component to the second entity; and
- verifying whether an ownership instruction received during the escrow period is validly signed, the received ownership instruction being validly signed when signed by a copy of the transfer cryptographic key recomposed using the first cryptographic key component and the second cryptographic key component, the received ownership instruction being invalidly signed when not signed by the copy of the transfer cryptographic key.

16. The one or more tangible processor-readable storage media of claim 15 further comprising:
- verifying whether an ownership instruction received outside the escrow period is validly signed, the ownership instruction received outside the escrow period being validly signed when signed by a prior cryptographic key associated with the first entity.

17. The one or more tangible processor-readable storage media of claim 15 wherein the transfer cryptographic key is a private cryptographic key paired with a public cryptographic key accessible by the secure platform device, the secure platform device using the public cryptographic key to verify whether the received ownership instruction is validly signed during the escrow period.

18. The one or more tangible processor-readable storage media of claim 15 wherein the received ownership instruction is received during the escrow period and is signed by the copy of the transfer cryptographic key recomposed using the first cryptographic key component and the second cryptographic key component, the received ownership instruction including an identification of a new cryptographic key and further comprising:
- verifying whether subsequently received instructions are validly signed, the verification using the new cryptographic key.

19. The one or more tangible processor-readable storage media of claim 15 wherein access to the asset is managed according to one or more access authorization records stored in a storage system secured by the access configuration controller and further comprising:
- receiving from the second entity an access control change instruction signed by the copy of the transfer cryptographic key recomposed using the first cryptographic key component and the second cryptographic key component;
- verifying a valid signing of the access control change instruction using of the transfer cryptographic key; and
- altering, by the access configuration controller, the one or more access authorization records according to the access control change instruction, responsive to verification of the valid signing of the access control change instruction.

20. The one or more tangible processor-readable storage media of claim 15 further comprising:
- distributing the second cryptographic key component to the first entity.

* * * * *